United States Patent
Moon

(10) Patent No.: US 12,124,369 B2
(45) Date of Patent: Oct. 22, 2024

(54) VIRTUALIZED SYSTEM AND METHOD OF CONTROLLING ACCESS TO NONVOLATILE MEMORY DEVICE IN VIRTUALIZATION ENVIRONMENT

(71) Applicant: Samsung Electronics Co., Ltd., Suwon-si (KR)

(72) Inventor: Dongouk Moon, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 10 days.

(21) Appl. No.: 17/953,685

(22) Filed: Sep. 27, 2022

(65) Prior Publication Data

US 2023/0147952 A1 May 11, 2023

(30) Foreign Application Priority Data

Nov. 10, 2021 (KR) .................. 10-2021-0153885
Apr. 20, 2022 (KR) .................. 10-2022-0048791

(51) Int. Cl.
*G06F 12/02* (2006.01)

(52) U.S. Cl.
CPC ...... *G06F 12/0292* (2013.01); *G06F 12/0253* (2013.01); *G06F 2212/1052* (2013.01); *G06F 2212/152* (2013.01); *G06F 2212/2022* (2013.01)

(58) Field of Classification Search
CPC ............ G06F 12/0292; G06F 12/0246; G06F 12/109; G06F 12/0253; G06F 2212/152; G06F 2212/2022; G06F 2212/7201; G06F 2212/657; G06F 3/0679; G06F 3/061; G06F 3/064; G06F 3/0662; G06F 3/0665; G06F 2009/45579; G06F 2009/45558; G06F 2009/45583

See application file for complete search history.

(56) References Cited

U.S. PATENT DOCUMENTS

| | | |
|---|---|---|
| 7,657,659 B1 | 2/2010 | Lambeth et al. |
| 8,245,227 B2 | 8/2012 | Devine et al. |
| 10,235,198 B2 | 3/2019 | Qiu et al. |

(Continued)

FOREIGN PATENT DOCUMENTS

JP 2019-0101467 A 6/2019

OTHER PUBLICATIONS

Kubernetes, "Pods," Nov. 5, 2021, The Wayback Machine—https://web.archive.org/web/20211105110435/https://kubernetes.io/docs/concepts/workloads/pods/_print/.*

(Continued)

*Primary Examiner* — Tracy A Warren

(74) *Attorney, Agent, or Firm* — Harness, Dickey & Pierce, P.L.C.

(57) ABSTRACT

A virtualized system includes a nonvolatile memory device, a processing circuitry configured to provide a virtualization environment, implement a plurality of virtual units and implement a virtual unit manager. The virtual units operate independently of each other in the virtualization environment and perform a flash translation layer operation inside the virtual units. The flash translation layer operation includes converting a logical block address associated with a storage access operation of the nonvolatile memory device to a physical block address of the nonvolatile memory device. The virtual unit manager controls the virtual units in the virtualization environment.

19 Claims, 23 Drawing Sheets

(56) References Cited

U.S. PATENT DOCUMENTS

| | | |
|---|---|---|
| 10,496,548 B2 | 12/2019 | Li |
| 10,592,428 B1 | 3/2020 | Saidi |
| 10,866,909 B2 | 12/2020 | Dewan et al. |
| 11,048,541 B2 | 6/2021 | Qiu et al. |
| 2017/0242722 A1* | 8/2017 | Qiu .................. G06F 3/0655 |
| 2017/0262176 A1* | 9/2017 | Kanno ............... G06F 3/0613 |
| 2018/0173430 A1* | 6/2018 | Kanno ............... G06F 3/0611 |
| 2018/0173434 A1* | 6/2018 | Li ..................... G06F 13/4282 |
| 2018/0373647 A1* | 12/2018 | Dewan ............... G06F 12/1027 |
| 2019/0227921 A1* | 7/2019 | Frolikov ............. G06F 9/5016 |
| 2019/0235983 A1* | 8/2019 | Campi ............... G06F 11/3062 |
| 2019/0243773 A1* | 8/2019 | Li ..................... G06F 3/0659 |
| 2019/0361749 A1* | 11/2019 | Tsirkin ............... G06F 9/45533 |
| 2020/0225875 A1 | 7/2020 | Oh |
| 2022/0027265 A1* | 1/2022 | Li ..................... G06F 12/0246 |
| 2022/0050701 A1* | 2/2022 | Qiu ................... G06F 9/45545 |
| 2022/0206915 A1* | 6/2022 | Li ..................... G06F 3/064 |

OTHER PUBLICATIONS

Song, Xiang et al., "Architecting Flash-based Solid-State Drive for High-performance I/O Virtualization", IEEE Computer Architecture Letters, IEEE, USA, vol. 13, No. 2, Jul. 28, 2014 (Jul. 28, 2014), pp. 61-64, XP011568654.

Unais, Muhammed et al., "SymFlex: Elastic, Persistent and Symbiotic SSD Caching in Virtualization Environments", Proceedings of the ACM/SPEC International Conference on Performance Engineering, ACMPUB27, New York, NY, USA, Apr. 19, 2021 (Apr. 19, 2021), pp. 105-115, XP058563137.

Extended European Search Report, dated Apr. 3, 2023, issued in corresponding European Patent Application No. 22197701.0.

* cited by examiner

VIRTUALIZED SYSTEM AND METHOD OF CONTROLLING ACCESS TO NONVOLATILE MEMORY DEVICE IN VIRTUALIZATION ENVIRONMENT

CROSS-REFERENCE TO RELATED APPLICATIONS

This U.S. non-provisional application claims priority under 35 USC § 119 to Korean Patent Application No. 10-2021-0153885 filed on Nov. 10, 2021 in the Korean Intellectual Property Office (KIPO) and Korean Patent Application No. 10-2022-0048791 filed on Apr. 20, 2022, in the KIPO, the disclosures of which are incorporated by reference herein in their entirety.

BACKGROUND

1. Technical Field

Example embodiments relate generally to semiconductor integrated circuits, and more particularly to a virtualized system and a method of controlling access to a nonvolatile memory device in virtualization environment.

2. Discussion of the Related Art

Virtualization of computing resources is a technology of providing an abstract layer between physical resources and applications so as to efficiently utilize the physical resources and enhance security. Virtualized systems may provide virtualization environments using the virtualization technology. Virtualized systems providing virtualization environments may include virtual machines using a hypervisor configured to virtualize hardware resources and a virtualized system providing containers or a docker configured to virtualize an operating system (OS).

SUMMARY

Some example embodiments may provide a virtualized system and a method, capable of efficiently controlling access to a nonvolatile memory device in virtualization environment.

According to example embodiments, a virtualized system includes a nonvolatile memory device, and processing circuitry configured to provide a virtualization environment, implement a plurality of virtual units and implement a virtual unit manager. The plurality of virtual units operate independently of each other in the virtualization environment and perform a flash translation layer operation inside the plurality of virtual units. The flash translation layer operation includes converting a logical block address associated with a storage access operation of the nonvolatile memory device to a physical block address of the nonvolatile memory device. The virtual unit manager controls the plurality of virtual units in the virtualization environment.

According to example embodiments, a virtualized system includes, a nonvolatile memory device, a volatile memory device, and processing circuitry configured to provide a virtualization environment, implement a plurality of containers and implement a container engine. The plurality of containers operate independently of each other in the virtualization environment and perform a flash translation layer operation inside the plurality of containers. The flash translation layer operation includes converting a logical block address associated with a storage access operation of the nonvolatile memory device to a physical block address of the nonvolatile memory device. The container engine is configured to control the plurality of containers in the virtualization environment. The container engine is further configured to allocate a plurality of unit storage regions respectively corresponding to the plurality of containers in a physical address space of the nonvolatile memory device, and each container among the plurality of container is configured to map the logical block address to the physical block address of each unit storage region corresponding to the container.

According to example embodiments, a method of controlling access to a nonvolatile memory device in a virtualization environment including a plurality of virtual units and a virtual unit manager configured to control the plurality of virtual units, includes, allocating, by the virtual unit manager, a plurality of unit storage regions respectively corresponding to the plurality of virtual units in a physical address space of the nonvolatile memory device, performing, by each virtual unit among the plurality of virtual units, a flash translation layer operation to convert a logical block of the virtual unit to a physical block address of each unit storage region allocated to the virtual unit, and performing a storage access operation of the nonvolatile memory device based on the physical block address provided from each virtual unit.

The virtualized system and the method according to some example embodiments may normally perform the storage access operation of the other virtual units even though errors occur in some virtual units, by performing the flash translation layer (FTL) operation inside the virtual units.

In addition, the virtualized system and the method according to some example embodiments may efficiently manage the nonvolatile memory device and enhance the performance of the virtualized system by setting the unit storage regions of the nonvolatile memory device respectively corresponding to the virtual units such that each virtual unit may perform the management operation such as the garbage collection independently of the other virtual units.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EXAMPLE EMBODIMENTS

Figure 1:
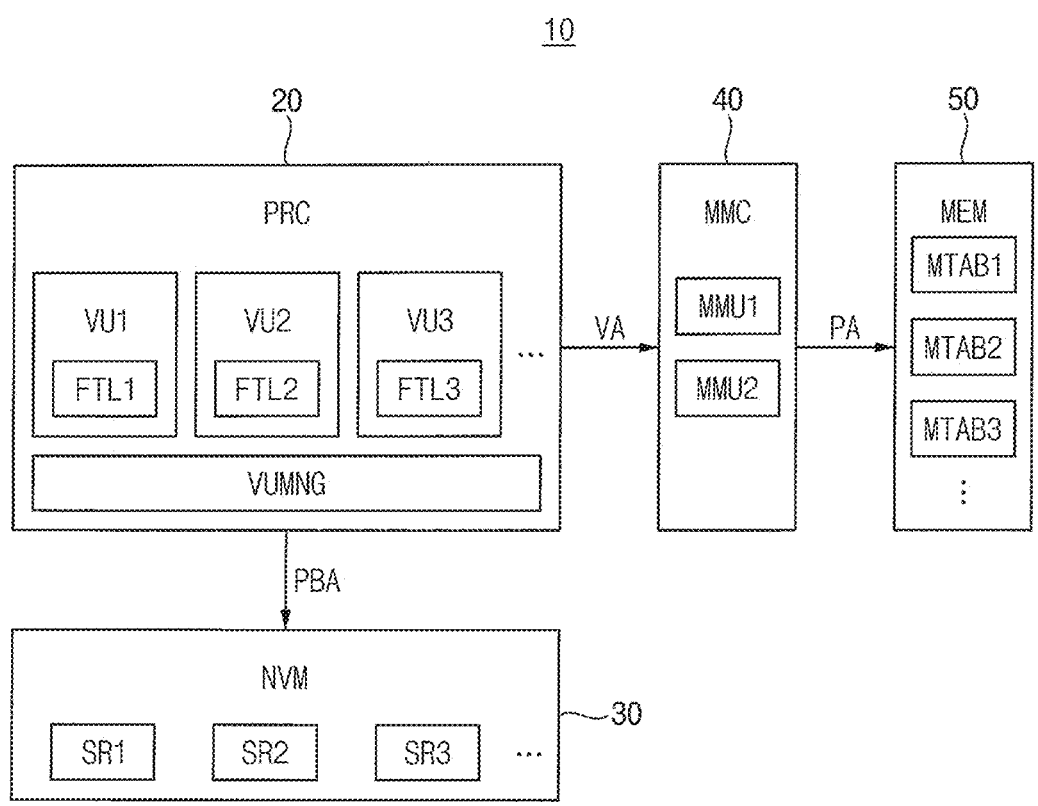
FIG. 1 is a block diagram illustrating a virtualized system according to some example embodiments.

Various example embodiments will be described more fully hereinafter with reference to the accompanying drawings, in which some example embodiments are shown. In the drawings, like numerals refer to like elements throughout. The repeated descriptions may be omitted.

Figure 2:
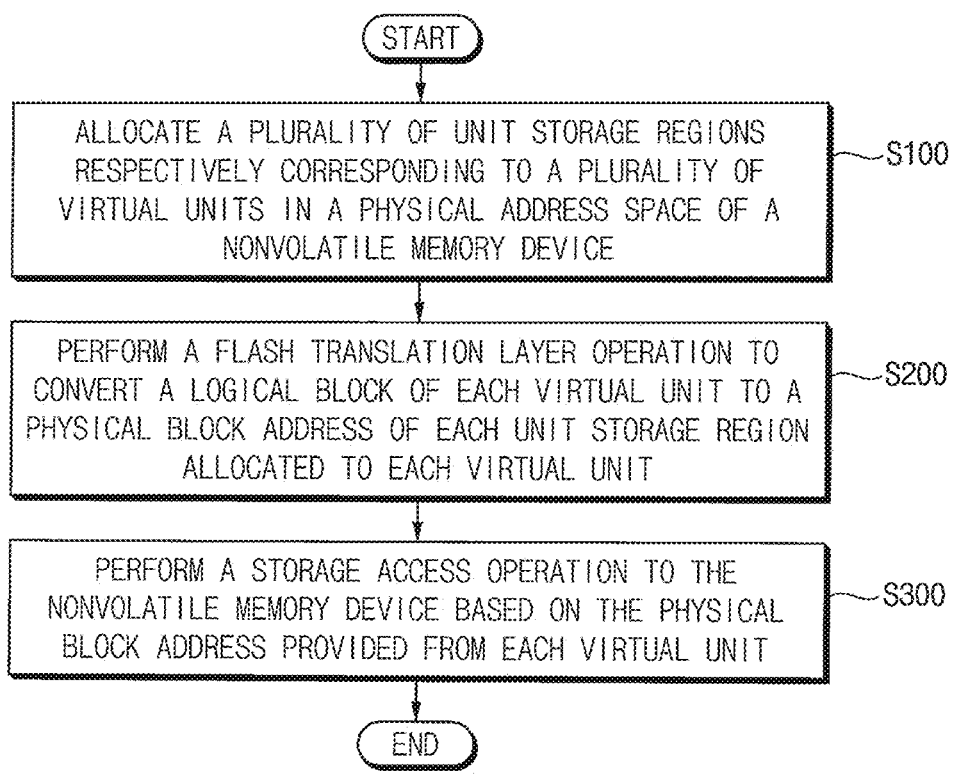
FIG. 2 is a flowchart illustrating a method of control access to a nonvolatile memory device in virtualization environment according to some example embodiments.

FIG. 1 is a block diagram illustrating a virtualized system according to example embodiments, and FIG. 2 is a flowchart illustrating a method of control access to a nonvolatile memory device in virtualization environment according to some example embodiments.

Referring to FIG. 1, a virtualized system 10 may include a processor PRC 20, a nonvolatile memory device NVM 30, a memory management circuit MMC 40 and a volatile memory device MEM 50. The processor PRC 20 may be an example of processing circuitry which implements a virtualization environment.

The volatile memory device 50 may store data and program codes. Software program codes to implement a virtualization environment such as a virtual unit manager VUMNG, a plurality of virtual units VU1~VU3, etc. may be loaded in the volatile memory device 50. The processor PRC 20 and/or other processing circuitry may implement the virtualization environment by executing the software program codes.

For example, while the virtualized system 10 is booted up, the software program codes stored the nonvolatile memory device 30 may be loaded in the volatile memory device 50 according to a booting sequence, and the processor 20 may provide a virtualization environment based on the loaded software program codes. As such, the volatile memory device 50 may be configured as a working memory of the virtualized system 10.

The volatile memory device 50 may be implemented with a volatile memory such as a dynamic random access memory (DRAM), a static random access memory (SRAM), etc., but example embodiments are not limited thereto. The volatile memory device 50 may be implemented with another type of volatile memory or a nonvolatile memory.

The memory management circuit 40 may manage a memory access of the processor 20 to the volatile memory device 50. The memory access may include a read operation to read data from the volatile memory device 50 and a write operation to store data to the volatile memory device 50.

The memory access may be performed based on a memory access request issued by the processor 20. The memory access request may include a virtual address VA for the read operation or the write operation. The memory management circuit 40 may perform address translation to provide a physical address PA mapped to the virtual address VA. The virtual address VA indicates a position in a virtual address space of an operating system and/or the plurality of virtual units VU1~VU3, and the physical address PA indicates a real physical position of a memory region of the volatile memory device 50. In some example embodiments, the memory management circuit 40 may include a first memory management unit MMU1 and a second memory management unit MMU2 to perform a two-stage address translation as will be described below with reference to FIGS. 18 and 19. According to example embodiments, the memory management circuit 40 may be implemented with hardware and/or program codes executed by the processor 20. Accordingly, the processor 20 may implement the memory management circuit 40 by executing the software program codes stored on the volatile memory device 50.

The processor 20 may provide and implement a virtualization environment. the virtual unit manager VUMNG and the plurality of virtual units VU1~VU3 may run on the virtualization environment. FIG. 1 illustrates the three virtual units VU1~VU3 for convenience of illustration and description, and example embodiments are not limited thereto. The number of the virtual units controlled by the virtual unit manager VUMNG may be determined variously according to the virtualization environment.

FIG. 1 illustrates that the virtual unit manager VUMNG and the plurality of virtual units VU1~VU3 are included in (or implemented by) the processor 20 for convenience of illustration. As described above, the virtual unit manager VUMNG and the plurality of virtual units VU1~VU3 may be loaded in the volatile memory device 50 as the software program codes and may be executed by the processor 20.

The plurality of virtual units VU1~VU3 may run independently from each other on a user space of the virtualization environment, and the virtual unit manager VUMNG may control the plurality of virtual units VU1~VU3 in the virtualization environment.

In some example embodiments, the virtualization environment may be a container-based virtualization environment. In this case, as will be described below with reference to FIGS. 10 through 13, the plurality of virtual units VU1~VU3 may correspond to a plurality of containers and the virtual unit manager VUMNG may correspond to a container engine.

In some example embodiments, the virtualization environment may be a virtual machine-based virtualization environment. In this case, as will be described below with reference to FIGS. 14 through 17, the plurality of virtual units VU1~VU3 may correspond to a plurality of virtual machines and the virtual unit manager VUMNG may correspond to a hypervisor.

Referring to FIGS. 1 and 2, the virtual unit manager VUMNG may allocate a plurality of unit storage regions SR1~SR3 respectively corresponding to the plurality of virtual units VU1~VU3 in a physical address space of the nonvolatile memory device 30 (S100). Example embodiments of allocating the plurality of unit storage regions SR1~SR3 will be described below with reference to FIGS. 3 through 5.

Each virtual unit VUi (i=1, 2, 3) may perform a flash translation layer operation to convert a logical block address of each virtual unit VUi to a physical block address of each unit storage region SRi allocated to each virtual unit VUi (S200).

As illustrated in FIG. 1, each virtual unit VUi may include each partial flash translation layer FTLi. Each partial flash translation layer FTLi may manage each partial mapping table MTABi that is loaded to the volatile memory device 50, and provide the physical block address mapped to the logical block address associated with the storage access operation based on each partial mapping table MTABi. Each partial mapping table MTABi may include mapping relations between the logical block address of each virtual unit VUi and the physical block address of each unit storage region SRi.

In other words, the first partial flash translation layer FTL1 included in the first virtual unit VU1 may provide the physical block address PBA pertaining to the first unit storage region SR1 based on the first partial mapping table MTAB1, the second partial flash translation layer FTL2 included in the second virtual unit VU2 may provide the physical block address PBA pertaining to the second unit storage region SR2 based on the second partial mapping table MTAB2, and the third partial flash translation layer FTL3 included in the third virtual unit VU3 may provide the physical block address PBA pertaining to the third unit storage region SR3 based on the third partial mapping table MTAB3. The flash translation layer operation by each partial flash translation layer FTLi will be further described with reference to FIGS. 6 and 7.

The virtualized system 10 may perform the storage access operation of the nonvolatile memory device 30 on the nonvolatile memory device 30 based on the physical block address PBA provided from each virtual unit VUi (S300). The storage access operation may include a data write (program) operation, a data read operation and an erase operation. The storage access operation with respect to the nonvolatile memory device 30 will be further described with reference to FIGS. 21 through 25.

In general, an entire system is powered off and then powered on again when the operating system is rebooted in a non-virtualization environment. During the rebooting sequence, the hardware operating with the processor stop operations and are reset into a hardware initialization state. In contrast, in the virtualization environment, the entire system may be able to maintain operation such that even though one virtual unit is rebooted, the remaining virtual units may run continuously.

In the conventional virtualization environment, the storage regions of the nonvolatile memory device are accessed using the flash translation layer that is managed by the kernel space or the user space external to the virtual units. In this case, all of the virtual units may not access the nonvolatile memory device when an error occurs in the flash translation layer.

In contrast, in the virtualization environment, according to some example embodiments, the flash translation layer operation may be dispersively performed inside the virtual units. Through the dispersive flash translation layer operation by the virtual units, even though the errors occur in some virtual units, the other virtual units may operate normally and thus the performance of the virtualized system may be enhanced.

Figure 3:
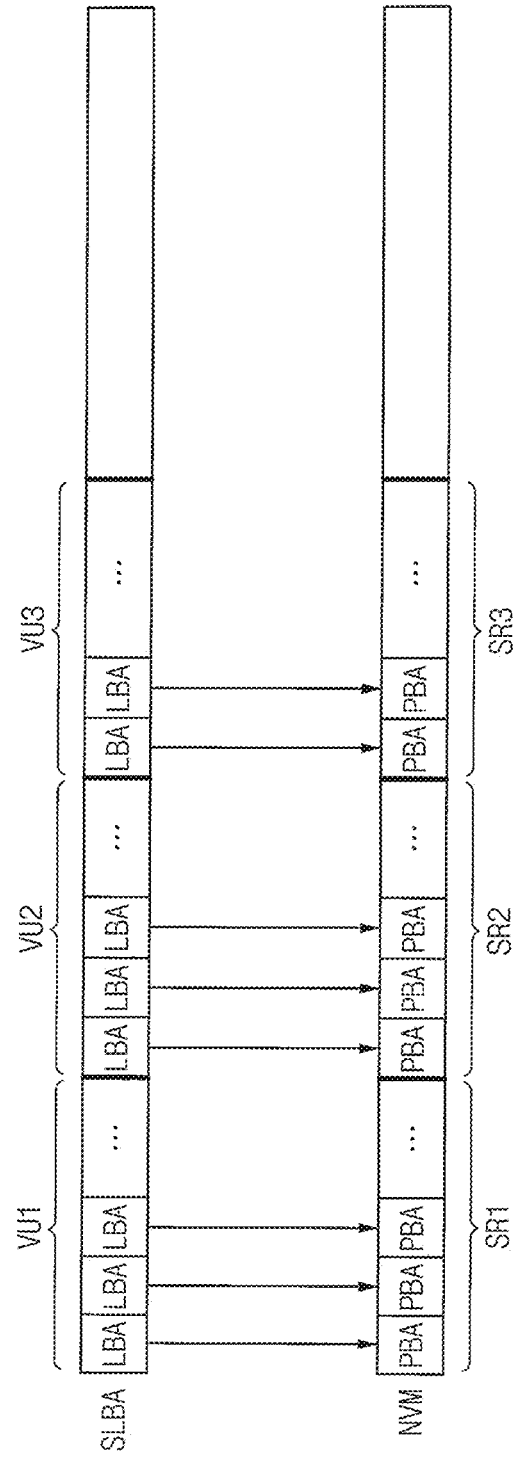
FIGS. 3, 4 and 5 are diagrams illustrating an example embodiment of setting unit storage regions in a virtualized system according to some example embodiments.
Figure 4:
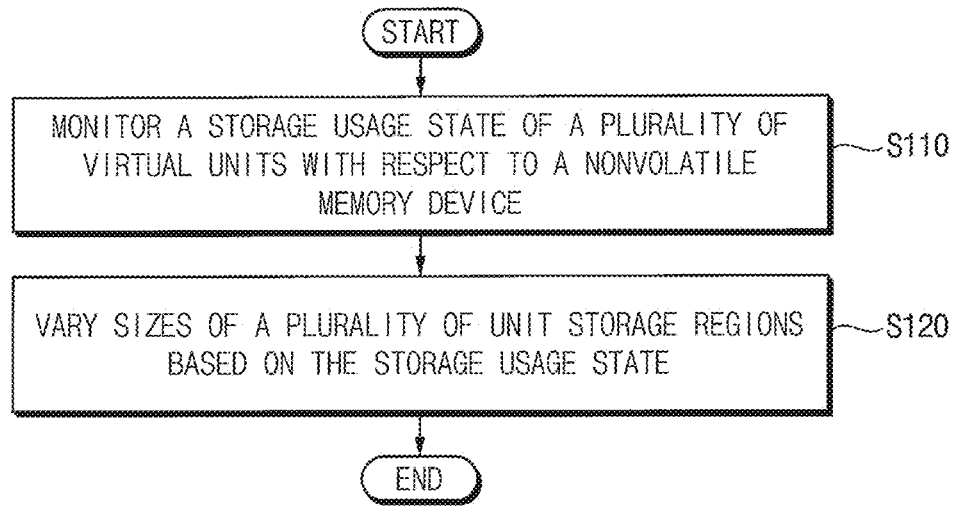
Figure 5:
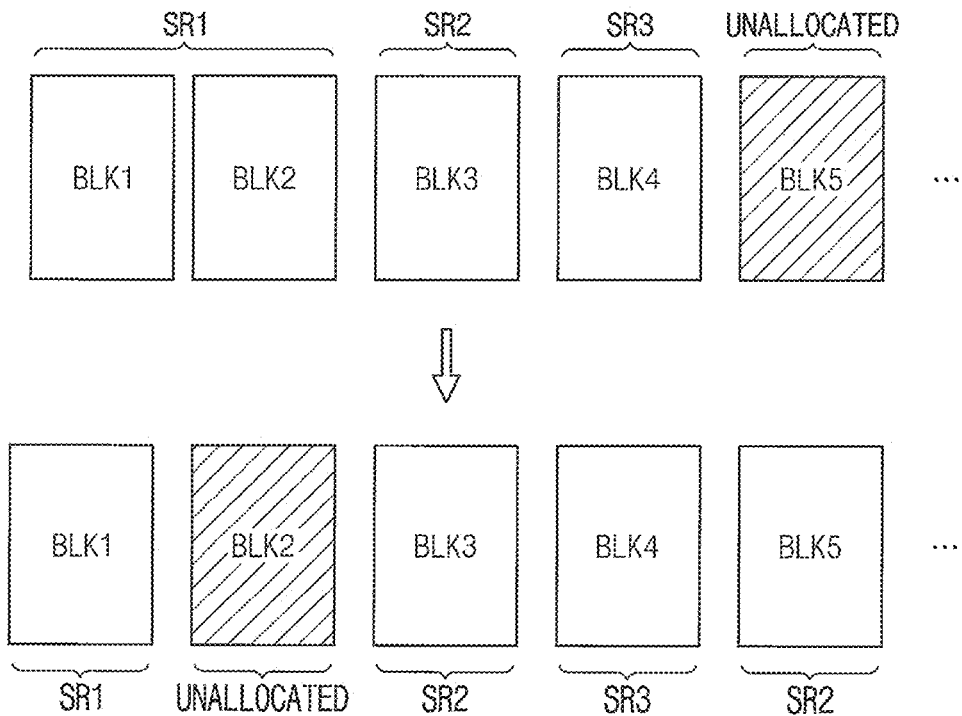

FIGS. 3, 4 and 5 are diagrams illustrating an example embodiment of setting unit storage regions in a virtualized system according to some example embodiments.

Referring to FIGS. 1, 2 and 3, the virtual unit manager VUMNG may allocate the plurality of unit storage regions SR1~SR3 respectively corresponding to the plurality of virtual units VU1~VU3 in the physical address space of the nonvolatile memory device NVM. Each virtual unit VUi (i=1, 2, 3) may map the logical block address LBA of each virtual unit VUi on a logical block address space SLBA to the physical block address PBA of each unit storage region SRi allocated to each virtual unit VUi.

In the conventional schemes, the data are written in the nonvolatile memory device NVM sequentially according to an order of write requests from a host device such that the data associated with the plurality of virtual units are mixed and written in the same memory block. In this case, the invalid data or the dirty data are increased and the garbage collection operation is performed to move only the valid data in one or more memory blocks to a new memory block. The garbage collection operation is performed during the input-output operation based the host device and the storage device including the nonvolatile memory device and the performance of the storage device and the system including the storage device may be degraded due to the overhead of the garbage collection operation. In addition, the frequent garbage collection may increase the erase and write operations and the lifetime of the nonvolatile memory device may be shortened.

In contrast, a zoned namespace write operation may be performed, according to some example embodiments, such that the data corresponding to each virtual unit VUi may be stored in each unit storage region SRi as illustrated in FIG. 3. In this case, each virtual unit VUi may independently perform the garbage collection operation with respect to each unit storage region SRi corresponding to each virtual unit VUi. According to the zoned namespace write operation, each of (or alternatively, at least one of) the plurality of virtual units VU1~VU3 may store the associated data in the predetermined (or alternatively, desired) zone and the frequency of the garbage collection operation may be reduced significantly. Accordingly, the lifetime of the nonvolatile memory device may be increased by reducing the frequency of the erase and write operations and the overhead due to the garbage collection may be reduced. In addition, the number of preliminary memory blocks used for the garbage collection may be reduced and the memory space of the nonvolatile memory device may be utilized efficiently.

Referring to FIGS. 1 and 4, the virtual unit manager VUMNG may monitor a storage usage state of the plurality of virtual units VU1~VU3 with respect to the nonvolatile memory device 30 (S110). For example, the virtual unit manager VUMNG may monitor the amount of the data stored by each virtual unit VUi in each unit storage region SRi, referring to the partial mapping tables MTAB1~MTAB3 loaded in the volatile memory device 50.

The virtual unit manager VUMNG may vary sizes of the plurality of unit storage regions SR1~SR3 based on the storage usage state (S120).

FIG. 5 illustrates an example of varying the sizes of the plurality of unit storage regions SR1~SR3. As will be described below with reference to FIGS. 24 and 25, the nonvolatile memory device may include a plurality of memory blocks where a memory block is a minimum unit (or alternatively, a base unit) of an erase operation. In this case, the virtual unit manager VUMNG may set each of (or alternatively, at least one of) the plurality of unit storage regions SR1~SR3 by units of memory blocks.

For example, as illustrated in FIG. 5, first and second memory blocks BLK1 and BLK2 may be set as the first unit storage region SRL a third memory block BLK3 may be set as the second unit storage region SR2, a fourth memory block BLK4 may be set as the third unit storage region SR3, and a fifth memory block BLK5 may be unallocated.

The storage usage state of the plurality of virtual units VU1~VU3 may be varied according to the operation of the virtualized system 10. For example, the data amount of the first virtual unit VU1 may be decreased and the data amount of the second virtual unit VU2 may be increased. In this case, the virtual unit manager VUMNG may set the second memory block BLK2 as the unallocated memory block and add the fifth memory block BLK5 which is not allocated, to the second unit storage region SR2, as illustrated in FIG. 5.

As such, the memory space of the nonvolatile memory device NVM may be managed efficiently by varying the sizes of the plurality of unit storage regions SR1~SR3 depending on the storage usage state of the plurality of virtual units VU1~VU3 with respect to the nonvolatile memory device NVM.

Figure 6:
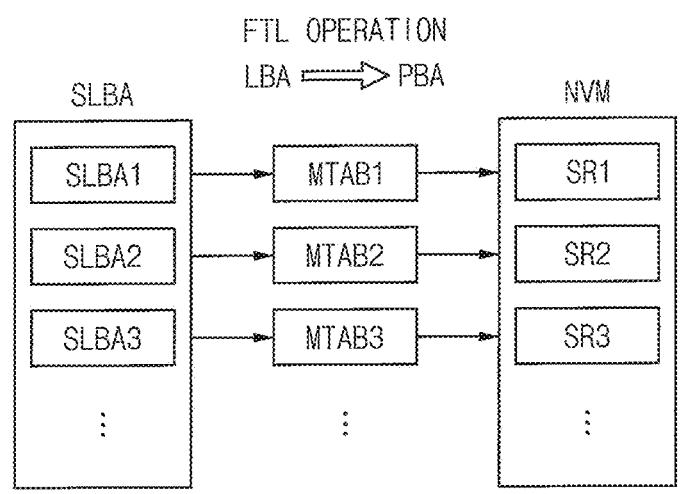
FIGS. 6 and 7 are diagrams illustrating a flash translation layer (FTL) operation to perform a storage access operation in a virtualized system according to some example embodiments.
Figure 7:
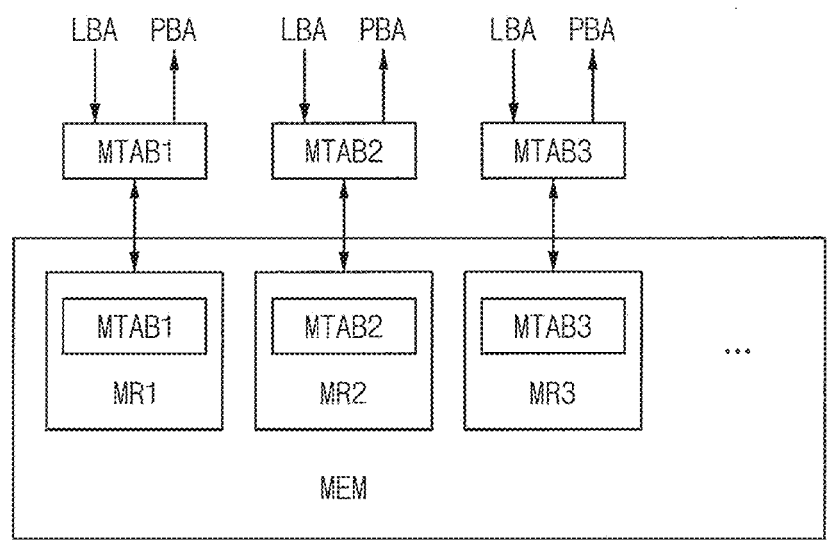

FIGS. 6 and 7 are diagrams illustrating a flash translation layer (FTL) operation to perform a storage access operation in a virtualized system according to some example embodiments.

Referring to FIGS. 6 and 7, the flash translation layer (FTL) operation may include converting the logical block address LBA to the physical block address PBA of the nonvolatile memory device NVM.

The logical block address LBA indicates a position in a logical block address space SLBA of the plurality of virtual units VU1~VU3, and the physical block address PBA indicates a real physical position of a storage region of the nonvolatile memory device NVM.

FIG. 6 illustrates, for convenience of illustration, that the logical block address spaces SLBA1~SLBA3 are spatially, and the superposition of the logical block address spaces SLBA1~SLBA3 may not be considered because the virtual units VU1~VU3 operate independently from each other.

As described above, the virtual unit manager VUMNG in FIG. 1 may allocate the plurality of unit storage regions SR1~SR3 respectively corresponding to the plurality of virtual units VU1-~VU3 in a physical address space of the nonvolatile memory device NVM. The plurality of unit storage regions SR1~SR3 may be allocated not to be spatially overlapped.

The first virtual unit VU1 may access dedicatedly to the first unit storage region SR1, the second virtual unit VU2 may access dedicatedly to the second unit storage region SR2, and the third virtual unit VU3 may access dedicatedly to the third unit storage region SR3. As a result, the spatial isolation may be provided to prevent or reduce crashes between the flash translation layer operations of the plurality of virtual units VU1~VU3.

Referring to FIG. 7, the plurality of partial mapping tables MTAB1~MTAB3 respectively corresponding to the plurality of virtual units VU1~VU3 may be loaded and stored in the plurality of unit memory regions MR1~MR3 of the volatile memory device MEM. The first partial mapping table MTAB1 includes the mapping relations between the logical block address LBA of the first virtual unit VU1 and the physical block address PBA of the first unit storage region SR1 of the nonvolatile memory device NVM, the second partial mapping table MTAB2 includes the mapping relations between the logical block address LBA of the second virtual unit VU2 and the physical block address PBA of the second unit storage region SR2 of the nonvolatile memory device NVM, and the third partial mapping table MTAB3 includes the mapping relations between the logical block address PBA of the third virtual unit VU3 and the physical block address PBA of the third unit storage region SR3 of the nonvolatile memory device NVM. The plurality of virtual units VU1~VU3 may perform the flash translation layer operation independently of each other, referring to the corresponding one of the plurality of partial mapping tables MTAB1~MTAB3.

Figure 8:
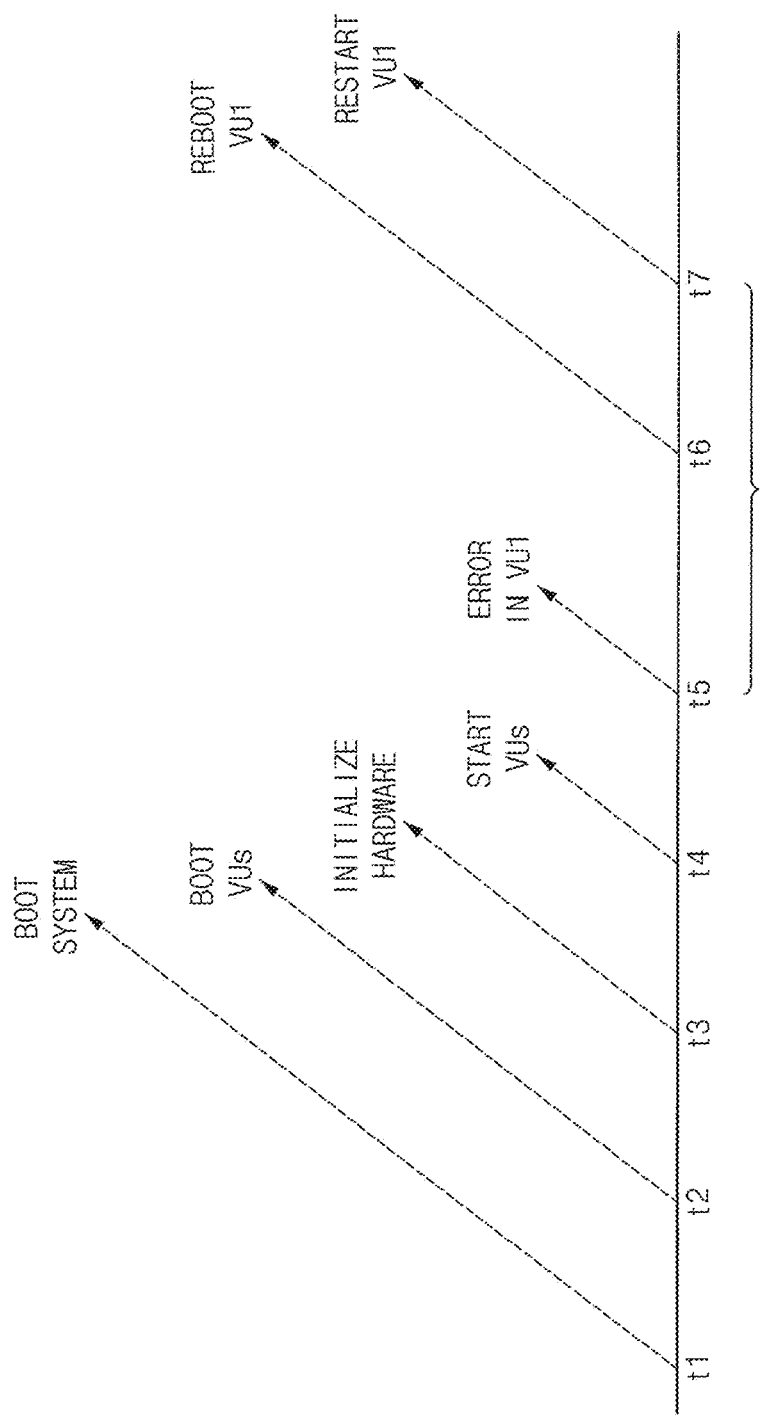
FIGS. 8 and 9 are diagrams for describing parallel FTL operations of a plurality of virtual units included in a virtualized system according to some example embodiments.
Figure 9:
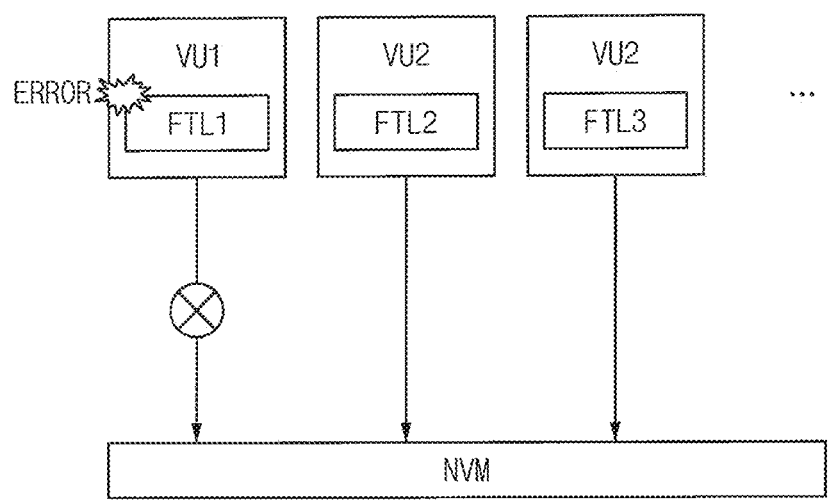

FIGS. 8 and 9 are diagrams for describing parallel FTL operations of a plurality of virtual units included in a virtualized system according to some example embodiments.

Referring to FIGS. 1 and 8, at time point t1, the virtualized system 10 may be booted by supplying power to the virtualized system 10. Booting of the virtualized system 10 may include storing initial setting values for the operations of the virtualized system 10 in registers included in the virtualized system 10 and loading software program codes corresponding to the virtual unit manager VUMNG to the volatile memory device 50.

At time point t2, the virtual unit manager VUMNG may boot the plurality of virtual units VUs, e.g., the first through third virtual units VU1~VU3. Booting of the plurality of virtual units VUs may include loading software program codes corresponding to the plurality of virtual units VUs to the volatile memory device 50.

At time point t3, the virtualized system 10 may initialize the hardware included in the virtualized system 10. The initialization of the hardware may include storing initial setting values for operations of the hardware in registers included in the virtualized system 10.

At time point t4, after all of the booting processes are completed, the plurality of virtual units VUs may start their operations.

After that, for example, at time point t5, a sudden reset of the first virtual unit VU1 may be triggered, for example, due to internal errors of the first virtual unit VU1 or external factors.

At time point t6, the virtual unit manager VUMNG may reboot the first virtual unit VU1.

At time point t7 when rebooting of the first virtual unit VU1 is completed, the first virtual unit VU1 may restart its operation.

The storage access operation of the first virtual unit VU1 may stop during time point t6 when the error occurs in the first virtual unit VU1 to time point t7 when the first virtual unit VU1 restarts its operation.

In the conventional virtualization environment, the flash translation layer is located in the kernel space or the user space external to the virtual units. In this case, all of the virtual units may not access the nonvolatile memory device when the flash translation layer has a problem or challenge due to an error of one virtual unit.

In contrast, in the virtualization environment, according to some example embodiments, the flash translation layer operation is performed dispersively inside the virtual units. Through the dispersive flash translation layer operation by the virtual units, even though the errors occur in some virtual units, the other virtual units may operate normally and thus the performance of the virtualized system may be enhanced.

Figure 10:
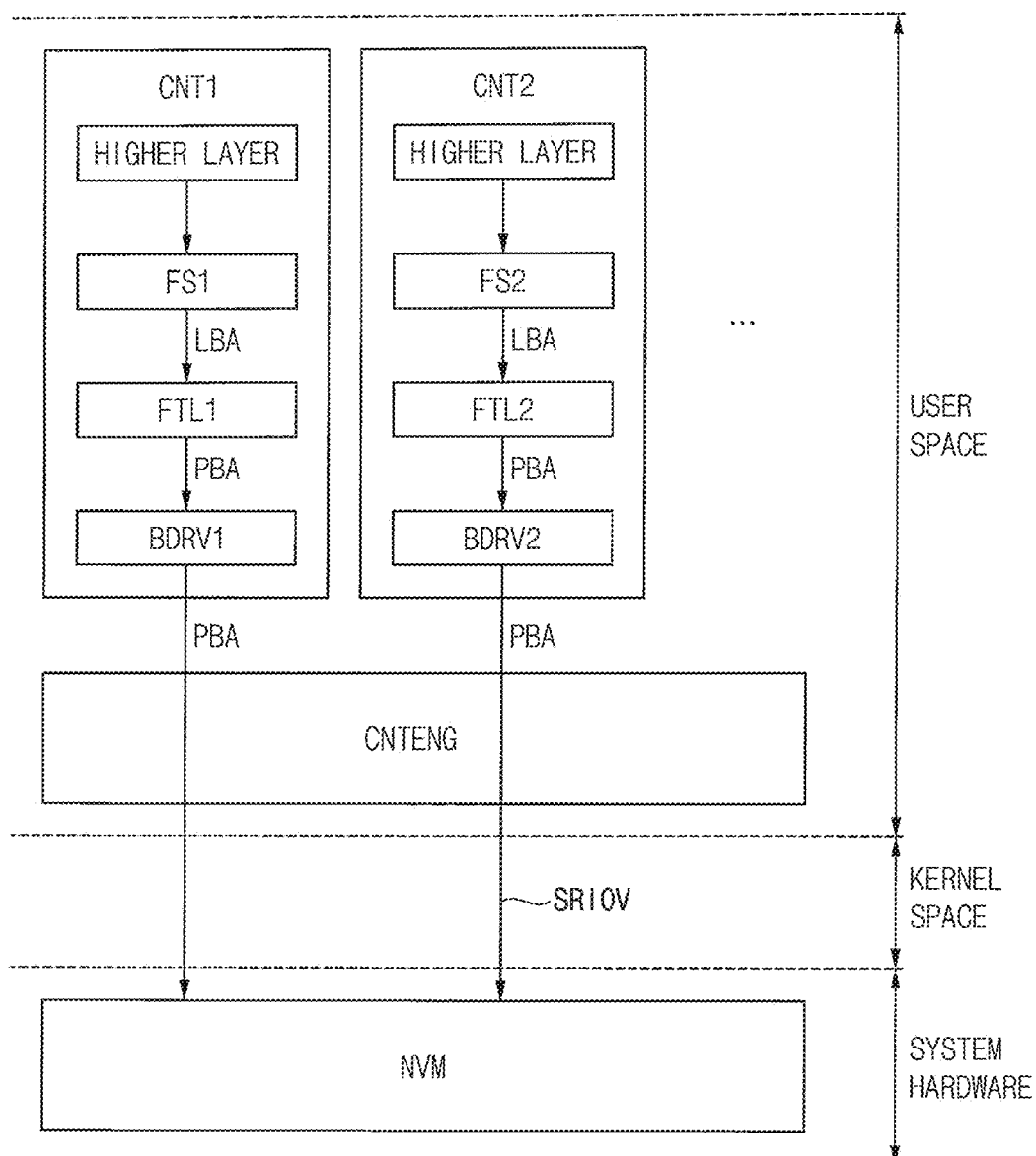
FIGS. 10 and 11 are block diagrams illustrating a container-based virtualized system according to some example embodiments.
Figure 11:
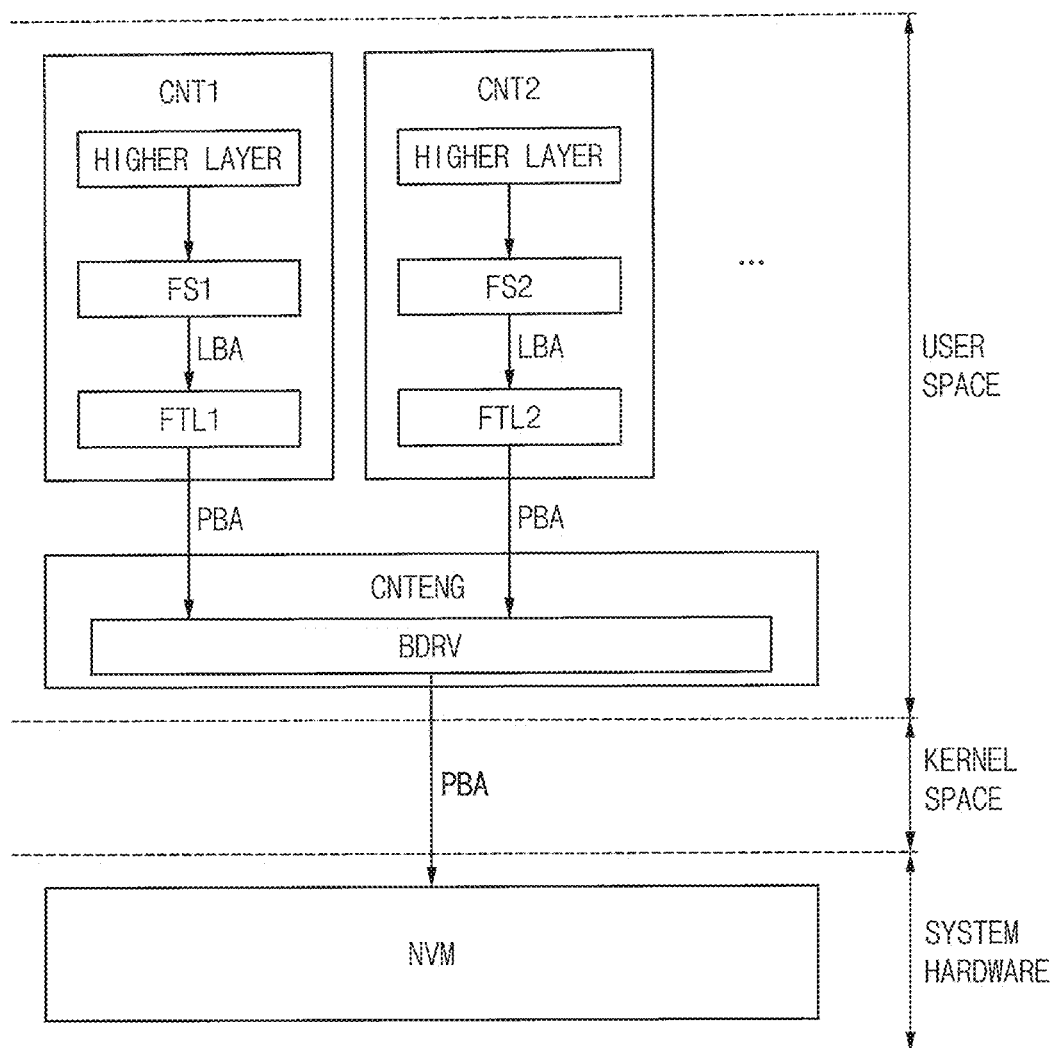

FIGS. 10 and 11 are block diagrams illustrating a container-based virtualized system according to some example embodiments.

Figure 12:
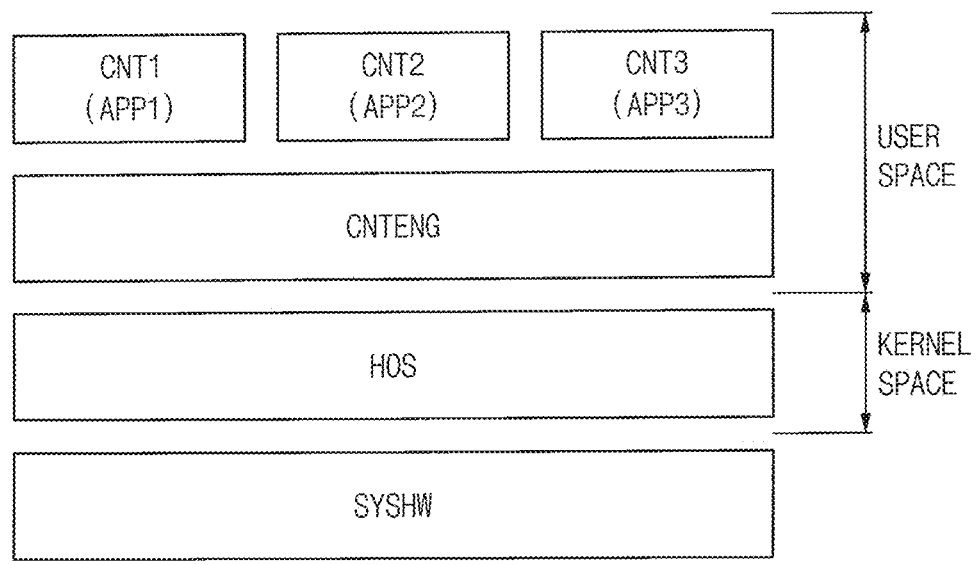
FIGS. 12 and 13 are diagrams illustrating example embodiments of a hierarchical structure of virtualization environment of a container-based virtualized system according to some example embodiments.

Referring to FIGS. 10 and 11, each of (or alternatively, at least one of) virtualized systems 11 and 12 may include a plurality of containers CNT1 and CNT2, a container engine CNTENG and system hardware. Even though only a nonvolatile memory device NVM is illustrated in FIGS. 11 and 12, the system hardware may include various components as will be described below. In addition, FIGS. 11 and 12 illustrate the two containers CNT1 and CNT2 for convenience of illustration and description, the number of the containers corresponding to the above-described virtual units may be determined variously.

The plurality of containers CNT1 and CNT2 may operate independently of each other in the virtualization environment. The plurality of containers CNT1 and CNT2 may perform the flash translation layer operation inside the plurality of containers CNT1 and CNT2. As described above, the flash translation layer operation includes converting the logical block address associated with the storage access operation of the nonvolatile memory device NVM to the physical block address of the nonvolatile memory device NVM.

The container engine CNTENG may control the plurality of containers CNT1 and CNT2 in the virtualization environment. The container engine CNTENG may be referred to as a container manager, a docker or a docker engine.

The plurality of containers CNT1 and CNT2 may be included in the user space of the virtualized system and transfer the physical block address PBA to the nonvolatile memory device NVM independently of the kernel space of the virtualization environment. To implement the direct access to the nonvolatile memory device NVM not via the kernel space, a scheme of single-route input-output virtualization (SRIOV) may be used.

The SRIOV scheme may allow each virtual unit coding to a container or a virtual machine to interact with persistent storage through an interface that emulates a separate mass storage device for each virtual unit. The SRIOV scheme may be used to allow a mass storage device to separately access to its resources among various Peripheral Component Interconnect Express (PCIe) hardware functions. These functions may include a PCIe physical function and one or more PCIe virtual functions. Each physical function and virtual function may be assigned a unique PCI Express Requester identifier (RID) that allows an input-output memory management unit (IOMMU) to differentiate between different traffic streams. Thus, assigning virtual functions to different virtual units may prevent or reduce input-output streams of different virtual units from interfering with each other while transferring data between the virtual units and mass storage device such as the nonvolatile memory device.

In some example embodiments, as illustrated in FIG. 10, each container CNTi (i=1, 2) may include a file system FSi, a partial flash translation layer FTLi and a block device driver BDRVi.

The file system FSi may receive information on storage access from a higher layer in each container CNTi and provide the logical block address LBA associated with the storage access operation.

As described above with reference to FIGS. 1 and 2, the partial flash translation layer FTLi may manage a partial mapping table MTABi that includes mapping relations between the logical block address LBA of each container CNTi and the physical block address PBA of each unit storage region SRi. The partial flash translation layer FTLi may provide the physical block address PBA mapped to the logical block address LBA provided from the file system FSi based on the partial mapping table MTABi.

The block device driver BDRVi may perform the storage access operation based on the physical block address PBA provided from the partial flash translation layer FTLi.

In some example embodiments, as illustrated in FIG. 11, each container CNTi (i=1, 2) may include the file system FSi and the partial flash translation layer FTLi. In comparison with the example embodiment of FIG. 10, each container CNTi may not include the block device driver BDRVi and instead the container engine CNTENG may include a block device driver BDRV that is shared by the plurality of containers CNT1 and CNT2.

The block device driver BDRV may perform the storage access operation based on the physical block address PBA provided from the plurality of containers CNT1 and CNT2. In this case, the container engine CNTENG is included in the user space and thus the block device driver BDRV may be included in the user space of the virtualization environment.

Figure 13:
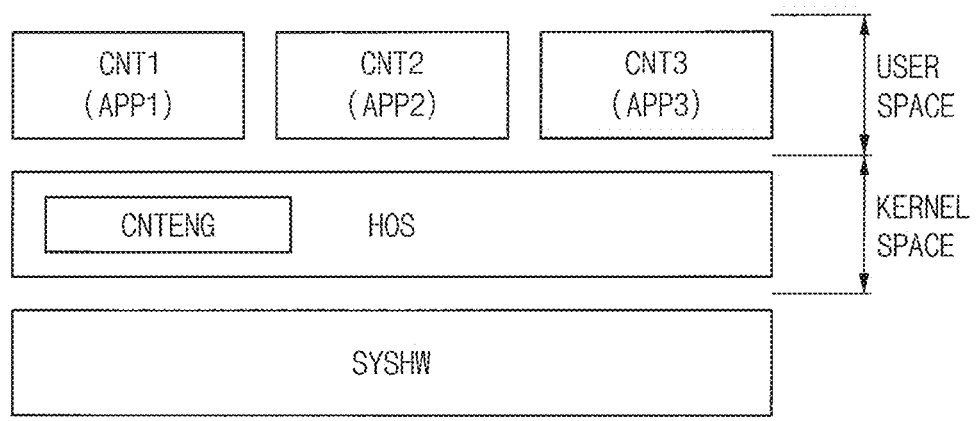

FIGS. 12 and 13 are diagrams illustrating example embodiments of a hierarchical structure of virtualization environment of a container-based virtualized system according to some example embodiments.

Referring to FIGS. 12 and 13, a virtualization environment may include a plurality of containers CNT1~CNT3 and a container engine CNTENG, which operation in a user space of the virtualization environment. For example, a first container CNT1 may be generated by containerizing a first application APP1, a second container CNT2 may be generated by containerizing a second application APP2, and a third container CNT3 may be generated by containerizing a third application APP3.

According to some example embodiments, the container engine CNTENG may operate on a host operating system HOS in the kernel space of the virtualization environment as illustrated in FIG. 12, or the container engine CNTENG may be included in the host operating system HOS as illustrated in FIG. 13. The host operating system HOS may control the system hardware SYSHW and operate on the system hardware SYSHW.

Figure 14:
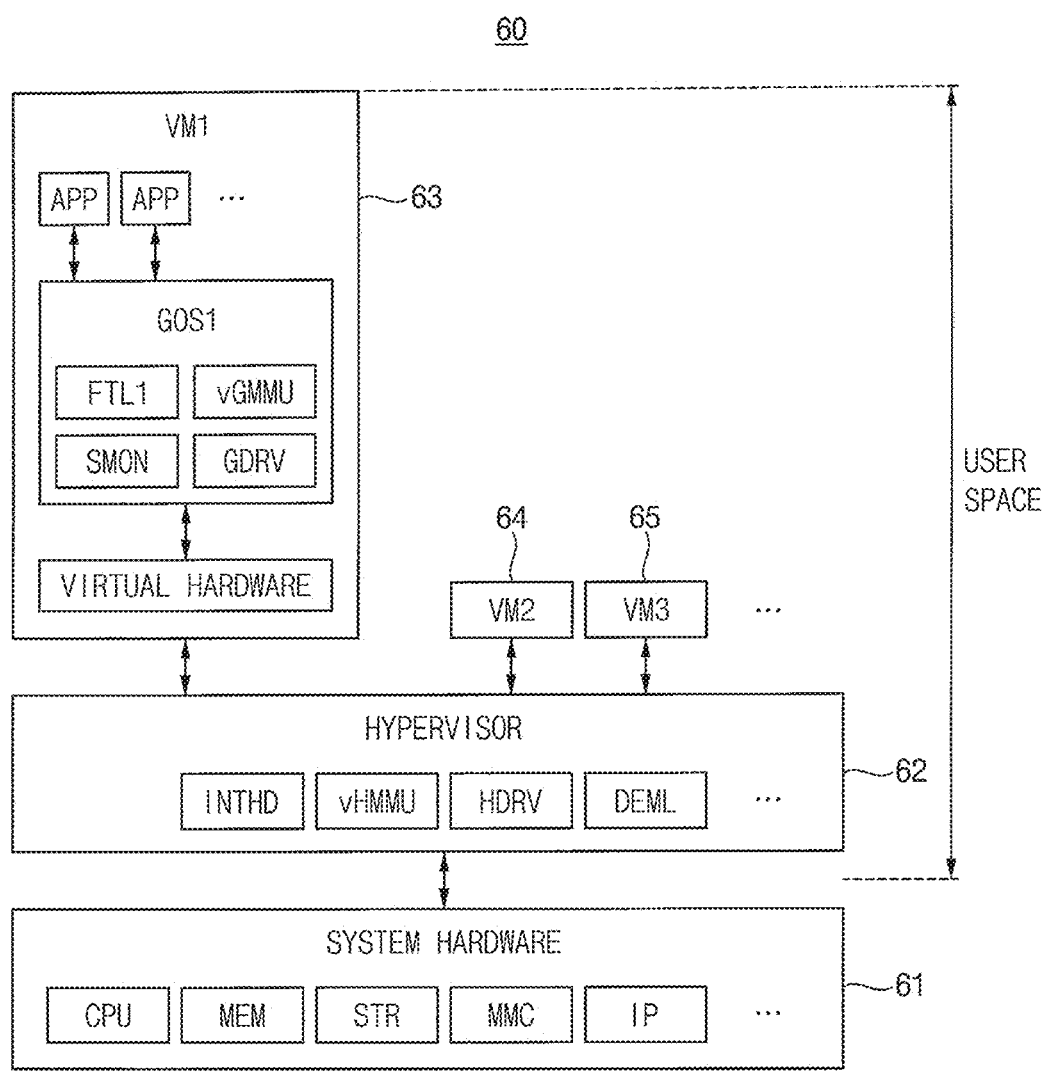
FIG. 14 is a block diagram illustrating a virtual machine-based virtualized system according to some example embodiments.

FIG. 14 is a block diagram illustrating a virtual machine-based virtualized system according to some example embodiments.

Referring to FIG. 14, a virtualized system 60 may include system hardware 61 and software runs on a virtualization environment provided by the system hardware 61. The software may include a hypervisor 62 corresponding to the above-described virtual unit manager and a plurality of virtual machines VM1 63, VM2 64 and VM3 63 corresponding to the above-described virtual units. FIG. 14 illustrates the three virtual machines 63, 64 and 65 for convenience of illustration, and the number of virtual machines installed on the hypervisor 62 may be determined variously.

The system hardware 61 may include a central processing unit CPU, a volatile memory device MEM, a storage device STR, a memory management circuit MMC, one or more intellectual properties IPs. The central processing unit CPU may be a single processor or include a plurality of processor cores. When the central processing unit CPU includes a plurality of processor cores, one of the processor cores may correspond to the processor 20 in FIG. 1 that provides the virtualization environment.

The virtual machines 63, 64 and 65 may have various configurations to perform respective functions. Hereinafter, one virtual machine 63 is described as an example. As illustrated in FIG. 14, the virtual machine 63 may include a virtual hardware, a guest operating system GOS1 and applications APP.

The virtual hardware may correspond to physical components that are emulated as software in the virtual machine 63. In other words, corresponding physical components of the virtualized system 60 may be virtualized as virtual hardware. The virtual hardware may include virtual components emulating the physical components allocated to the virtual machine 63 among the entire physical components in the system hardware 61. For example, the virtual hardware may include a virtual processor emulating the central processing unit CPU, a virtual memory device emulating the volatile memory device MEM, a virtual IP emulating the IP, etc.

For example, the guest operating system GOS1 may include a virtual memory management unit vGMMU, a device driver GDRV, a state monitor SMON, a partial flash translation layer FTL1, etc.

The virtual memory management unit vGMMU may allocate a virtual address space of the guest operating system GOS1 to the applications APP running on the guest operating system GOS1. The virtual memory management unit vGMMU may manage mapping between a virtual address in the virtual address space and an intermediate physical address of the virtual memory device included in the virtual hardware.

The device driver GDRV may control the IP included in the system hardware 61 via the virtual IP included in the virtual hardware.

The state monitor SMON may provide state information by monitoring the virtual machine 63 and/or the guest operating system GOS1. For example, the state monitor SMON may provide the state information periodically while the virtual machine 63 operates normally. In this case, the hypervisor 62 may determine whether to reboot the guest operating system GOS1 when the state information is not provided for a predetermined (or alternatively, desired) time interval.

The hypervisor 62 may generate, schedule, and manage the plurality of virtual machines 63, 64 and 65. The hypervisor 62 may provide interface between the plurality of virtual machines 63, 64 and 65 and the system hardware 61, and manage execution of instructions and data transfer associated with the plurality of virtual machines 63, 64 and 65. The hypervisor 62 may be referred to as a virtual machine monitor or a virtual machine manager.

For example, the hypervisor 62 may include an interrupt handler INTHD, a virtual memory management unit vHMMU, a device driver HDRV, a device emulator DEML, etc.

The virtual memory management unit vHMMU may allocate a plurality of guest memory regions of the volatile memory device MEM to the plurality of virtual machines 63, 64 and 65 or the plurality of guest operating systems. The virtual memory management unit vHMMU may manage mapping between the intermediate physical address of the virtual memory devices in the plurality of virtual machines 63, 64 and 65 and the physical address of the volatile memory device MEM.

The device driver HDRV may directly control the IP included in the system hardware 61. Each IP in the system hardware 61 may be controlled by the device driver GDRV included in the guest operating system GOS1 and/or the device driver HDRV included in the hypervisor 62.

The interrupt handler INTHD may control abnormal operations of the virtualized system 60 based on information from the virtual machines 63, 64 and 65 and/or information from the system hardware 61. For example, the interrupt handler INTHD may determine rebooting of guest operating systems respectively included in the virtual machines 63, 64 and 65.

The device emulator DEML may allocate the physical components respectively to the virtual machines 63, 64 and 65, and establish and manage the virtual hardware by emulating the allocated physical components.

As illustrated in FIG. 14, the virtual machine VM1 may include the partial flash translation layer FTL1 that is dedicated to the virtual machine VM1 to perform the flash translation layer operation independently of the other virtual machines VM2 and VM3.

As described above, the partial flash translation layer FTL1 may manage the partial mapping table MTAB1 including the mapping relations between the logical block address of the virtual machine VM1 and the physical block address of the unit storage region SR1 allocated to the virtual machine VM1. The storage region of a nonvolatile memory device included in the storage device STR may be allocated as the unit storage region SRL The partial flash translation layer FTL1 may provide the physical block address mapped to the logical block address associated with the storage access operation based on the partial mapping table MTAB1.

Figure 15:
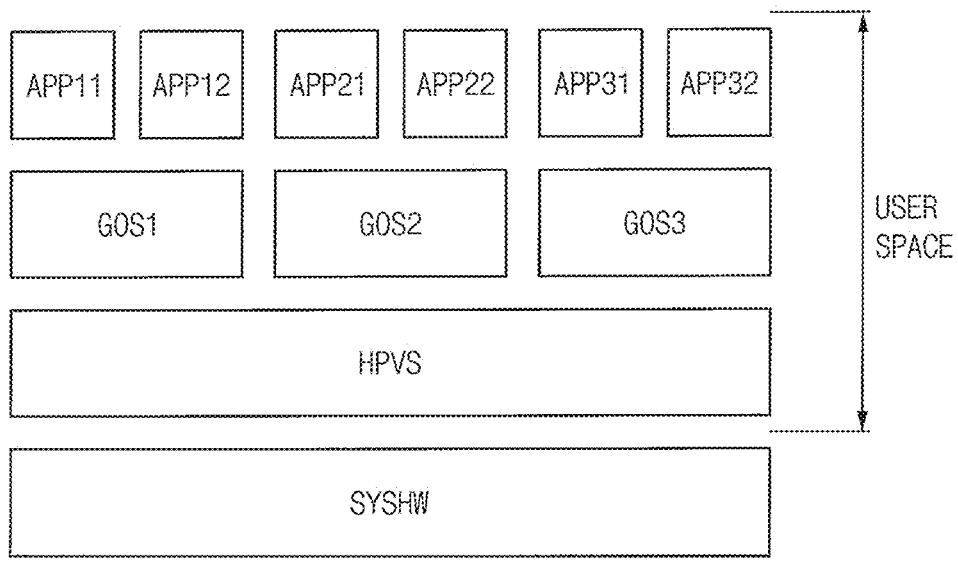
FIGS. 15, 16 and 17 are diagrams illustrating example embodiments of a hierarchical structure of a virtualization environment of a virtual machine-based virtualized system according to some example embodiments.
Figure 16:
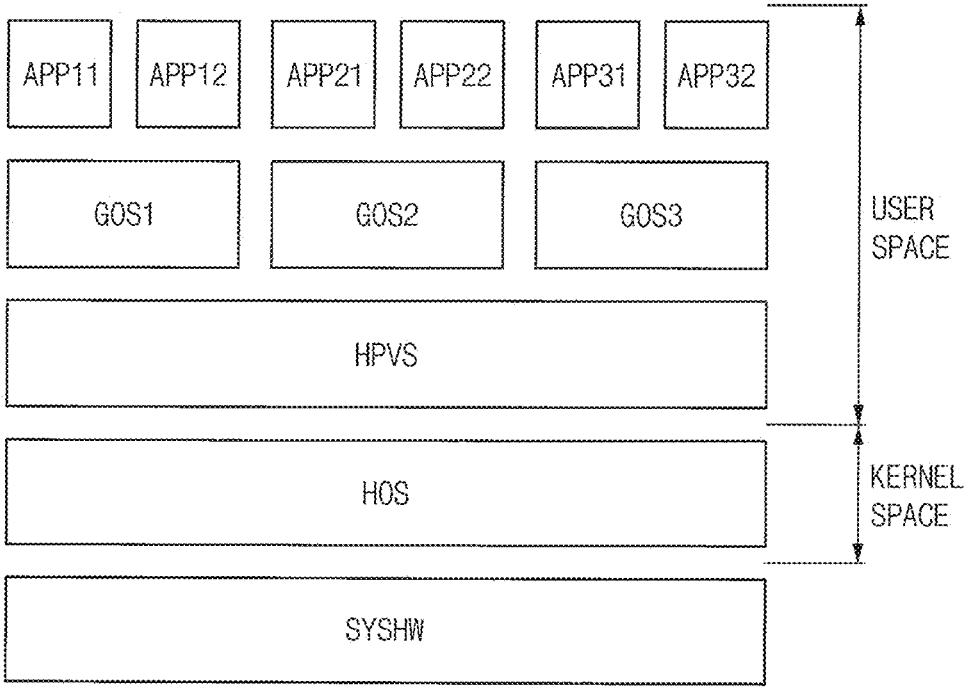
Figure 17:
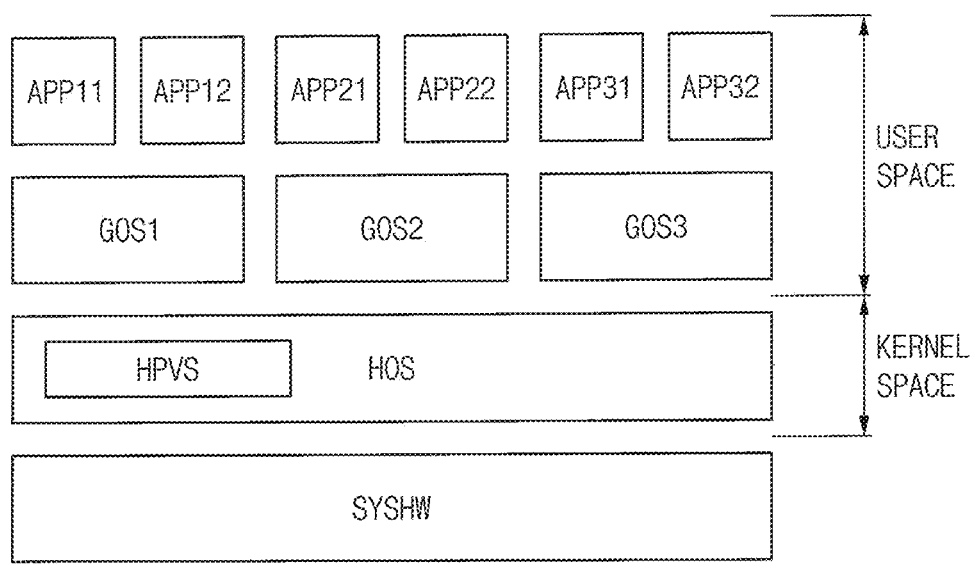

FIGS. 15, 16 and 17 are diagrams illustrating example embodiments of a hierarchical structure of a virtualization environment of a virtual machine-based virtualized system according to some example embodiments.

Referring to FIGS. 15, 16 and 17, a virtualization environment may include a plurality of guest operating systems GOS1, GOS2 and GOS3 operating in the user space of the virtualization environment and applications running on the plurality of guest operating systems GOS1, GOS2 and GOS3. For example, the applications APP11 and APP12 may run on the first guest operating system GOS1, the applications APP21 and APP22 may run on the second guest operating system GOS2, and the applications APP31 and APP32 may run on the third guest operating system GOS3. The number of guest operating systems and the number of applications running on each guest operating system may be determined variously.

The hypervisor HPVS may be divided largely into a first type and a second type. FIG. 15 illustrates the hypervisor HPVS of the first type, and FIGS. 16 and 17 illustrate the hypervisors HPVS of the second type. The hypervisor HPVS of the first type may be referred to as a standalone hypervisor and the hypervisor HPVS of the second type may be referred to as a hosted hypervisor. The representative open source hypervisor includes Xen of the first type and KVM of the second type.

Referring to FIG. 15, the hypervisor HPVS of the first type may run on the system hardware SYSHW and have a full control with respect to the system hardware SYSHW. In this case, the host operating system does not exist in the virtualization hierarchical structure, and one of the guest operating systems GOS1, GOS2 and GOS3 may perform a function of the host operating system. The applications may run on the hypervisor HPVS of the first type.

The hypervisor HPVS of the second type may run on the host operating system HOS as illustrated in FIG. 16, or may be included in the host operating system HOS as illustrated in FIG. 17. In this case, the host operating system HOS has a full control with respect to the system hardware SYSHW. The host operating system HOS may run on the system hardware SYSHW and the applications may run on the host operating system HOS.

In this disclosure, example embodiments are described based on the hypervisor HPVS of the first type, but example embodiments are not limited thereto. Example embodiments may be applied to any virtualized systems including the hypervisor HPVS of the second type or other types.

Figure 18:
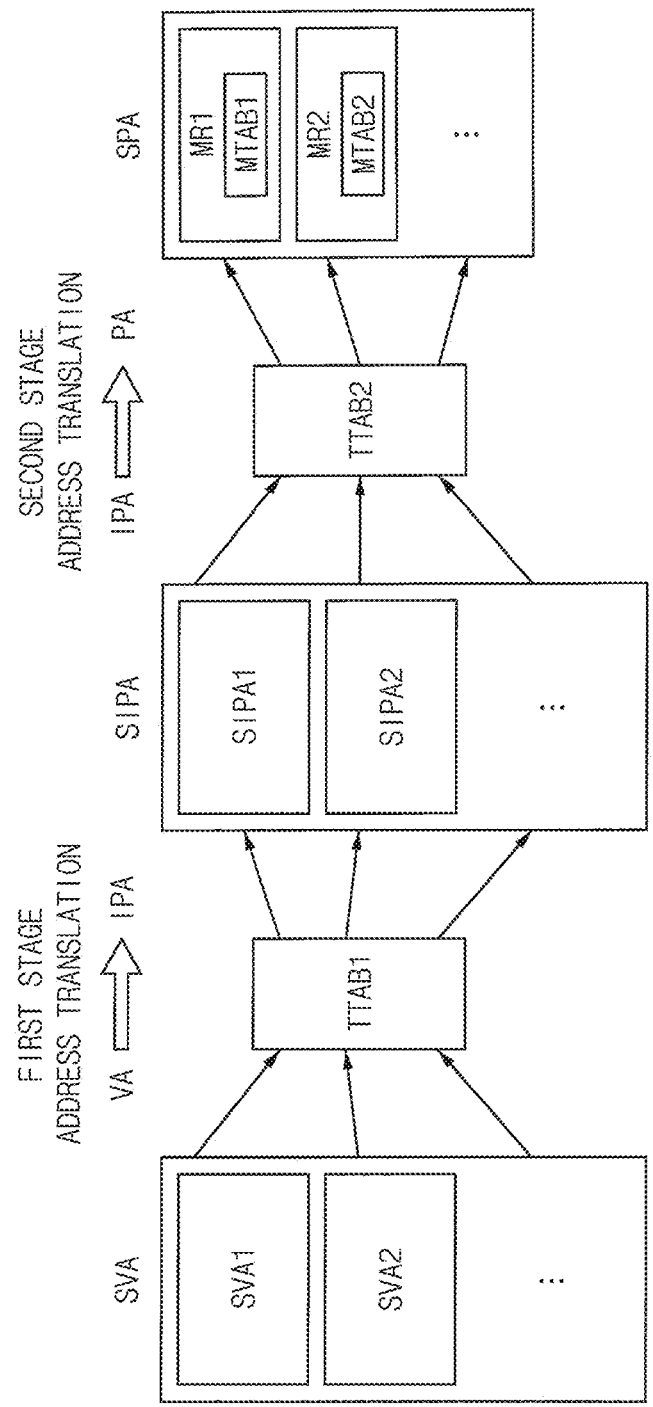
FIGS. 18 and 19 are diagrams illustrating a two-stage address translation of a virtualized system according to some example embodiments.
Figure 19:
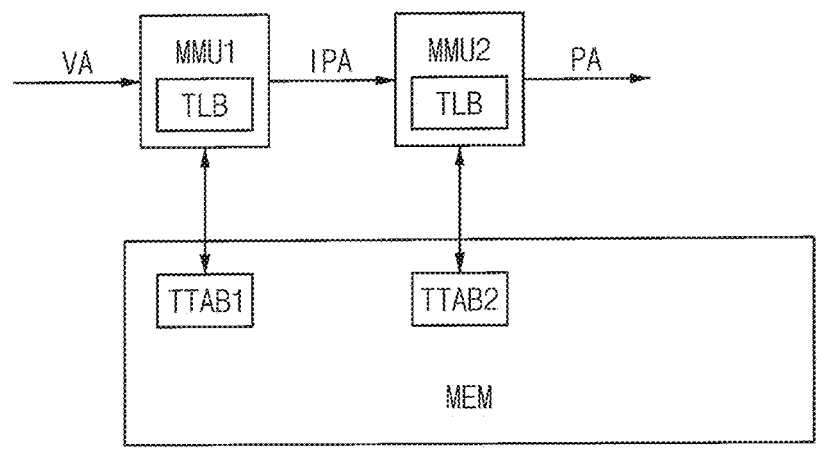

FIGS. 18 and 19 are diagrams illustrating a two-stage address translation of a virtualized system according to some example embodiments.

Referring to FIGS. 18 and 19, a two-stage address translation may include a first stage address translation to convert a virtual address VA of the plurality of guest operating systems to an intermediate physical address IPA of the virtual memory devices in the virtual machines and a second stage address translation to convert the intermediate address IPA to a physical address PA of the volatile memory device MEM.

The virtual address VA indicates a position in a virtual address space SVA, the intermediate physical address IPA indicates a position in an intermediate address space SIPA and the physical address PA indicates a real physical position of the memory region of the volatile memory device MEM.

As described with reference to FIG. 14, each of (or alternatively, at least one of) the guest operating systems GOS1 and GOS2 may include the virtual memory management unit vGMMU. The virtual memory management unit vGMMU may manage mapping between the virtual address VA of guest virtual address spaces SVA1 and SVA2 respectively corresponding to the guest operating systems GOS1 and GOS2, and the intermediate physical address IPA of the guest intermediate physical address spaces SIPA1 and SIPA2 respectively corresponding to the guest operating systems GOS1 and GOS2.

The mapping information managed by the virtual memory management unit vGMMU may be stored in the first stage translation table TTAB1 and the first stage translation table TTAB1 may be referenced to access the volatile memory device MEM.

FIG. 18 illustrates, for convenience of illustration, that the guest virtual address spaces SVA1 and SVA2 are spatially separated and the guest intermediate physical address spaces SIPA1 and SIPA2 are spatially separated. The superposition of the address spaces may not be considered because the guest operating systems GOS1 and GOS2 run independently from each other.

In addition, as described with reference to FIG. 14, the hypervisor HPVS may include the virtual memory management unit vHMMU. The virtual memory management unit vHMMU may allocate the guest memory regions MR1 and MR2 (corresponding to the above-described unit memory regions) of the volatile memory device MEM respectively to the guest operating systems GOS1 and GOS2. The guest memory regions MR1 and MR2 have to be allocated to be spatially separated from each other. The hypervisor HPVS may monitor a memory usage state of the plurality of guest operating systems GOS1 and GOS2 with respect to the volatile memory device MEM, and varies sizes of the guest memory regions MR1 and MR2 based on the memory usage state. The partial mapping tables MTAB1 and MTAB2 respectively corresponding to the virtual machines VM1 and VM2 may be loaded to the guest memory regions MR1 and MR2.

The first guest operating system GOS1 may access dedicatedly to the first guest memory region MR1 and the second guest operating system GOS2 may access dedicatedly to the second guest memory region MR2. In other words, the first guest operating system GOS1 is not able to access the second guest memory region MR2, and the second guest operating system GOS2 is not able to access the first guest memory region MR1. As a result, the hypervisor HPVS may provide spatial isolation to prevent or reduce memory crash between the plurality of guest operating systems GOS1 and GOS2.

The virtual memory management unit vHMMU may manage mapping between the intermediate physical address IPA of the guest intermediate physical address spaces SIPA1 and SIPA2 and the physical address PA of the allocated guest memory regions MR1 and MR2.

The mapping information managed by the virtual memory management unit vHMMU may be stored in the second stage translation table TTAB2 and the second stage translation table TTAB2 may be referenced to access the volatile memory device MEM.

Referring to FIG. 19, the first stage translation table TTAB1 and the second stage translation table TTAB2 including the address mapping information may be stored in the volatile memory device MEM. The first stage translation table TTAB1 and the second stage translation table TTAB2 stored in the volatile memory device MEM may be referenced for address translation during the access operations.

To enhance the speed and the efficiency of the address translation, the virtualized system may include memory management units MMU1 and MMU2 implemented as hardware as illustrated in FIG. 19. The memory management units MMU1 and MMU2 may be included in the memory management circuit 40 in FIG. 1.

The first memory management unit MMU1 may perform the first stage address translation based on the address mapping information of the first stage translation table TTAB1 to convert the virtual address VA for the access operation with respect to the volatile memory device MEM to the intermediate physical address IPA.

The second memory management unit MMU2 may perform the second stage address translation based on the address mapping information of the second stage translation table TTAB2 to convert the intermediate physical address IPA transferred from the first memory management unit MMU1 to the physical address PA of the volatile memory device MEM.

The first memory management unit MMU1 and/or the second memory management unit MMU2 may include a translation look aside buffer (TLB) to further enhance the speed and the efficiency of the address translation. The TLB may store the address mapping information referenced recently and/or frequently.

Figure 20:
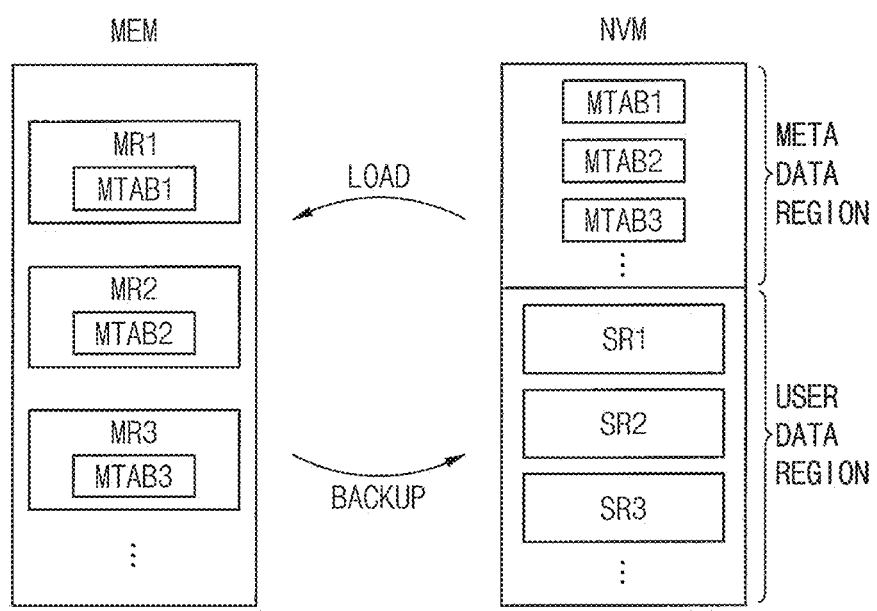
FIG. 20 is a diagram illustrating a loading operation and a backup operation of mapping information in a virtualized system according to some example embodiments.

FIG. 20 is a diagram illustrating a loading operation and a backup operation of mapping information in a virtualized system according to some example embodiments.

Referring to FIG. 20, a storage region of a nonvolatile memory device NVM may include a metadata region storing metadata and a user data region storing user data.

The metadata are data that are generated and managed by firmware of a storage device to control the nonvolatile memory device NVM included in the storage device, and the metadata are differentiated from the user data that are stored in the nonvolatile memory device by user requests. The metadata may include the mapping table including the mapping relations between the logical block address of the host device and the physical block address of the nonvolatile memory device NVM. In addition, the metadata may include various data to manage the storage space of the nonvolatile memory device NVM. As illustrated in FIG. 20, the above-described partial mapping tables MTAB1~MTAB3 may be stored in the metadata region, and the above-described unit storage regions SR1~SR3 may be set in the user data region.

Referring to FIGS. 1 and 20, the virtual unit manager VUMNG may load the plurality of partial mapping tables MTAB1~MTAB3 respectively corresponding to the plurality of virtual units VU1~VU3 from the nonvolatile memory device NVM respectively to the plurality of unit memory regions MR1~MR3 of the volatile memory device MEM while the virtualized system 10 is booted.

As described above, each partial mapping table MTABi (i=1, 2, 3) corresponding to each virtual unit VUi includes mapping relation between the logical block address of each virtual unit VUi and the physical block address of each unit storage region SRi.

Each virtual unit VUi may perform the flash translation layer operation based on each partial mapping table MTABi corresponding to each virtual unit VUi stored in each unit memory region MRi.

While the virtualized system 10 is powered off, the virtual unit manager VUMNG may back up the plurality of partial mapping tables MTAB1~MTAB3 respectively from the plurality of unit memory regions MR1~MR3 of the volatile memory device MEM to the nonvolatile memory device NVM.

The partial mapping tables MTAB1~MTAB3 stored in the volatile memory device MEM may be changed during the operation of the virtualized system 10. Thus various journaling schemes may be used to maintain consistency between the partial mapping tables MTAB1~MTAB3 stored in the volatile memory device MEM and the partial mapping tables MTAB1~MTAB3 stored in the nonvolatile memory device NVM.

Figure 21:
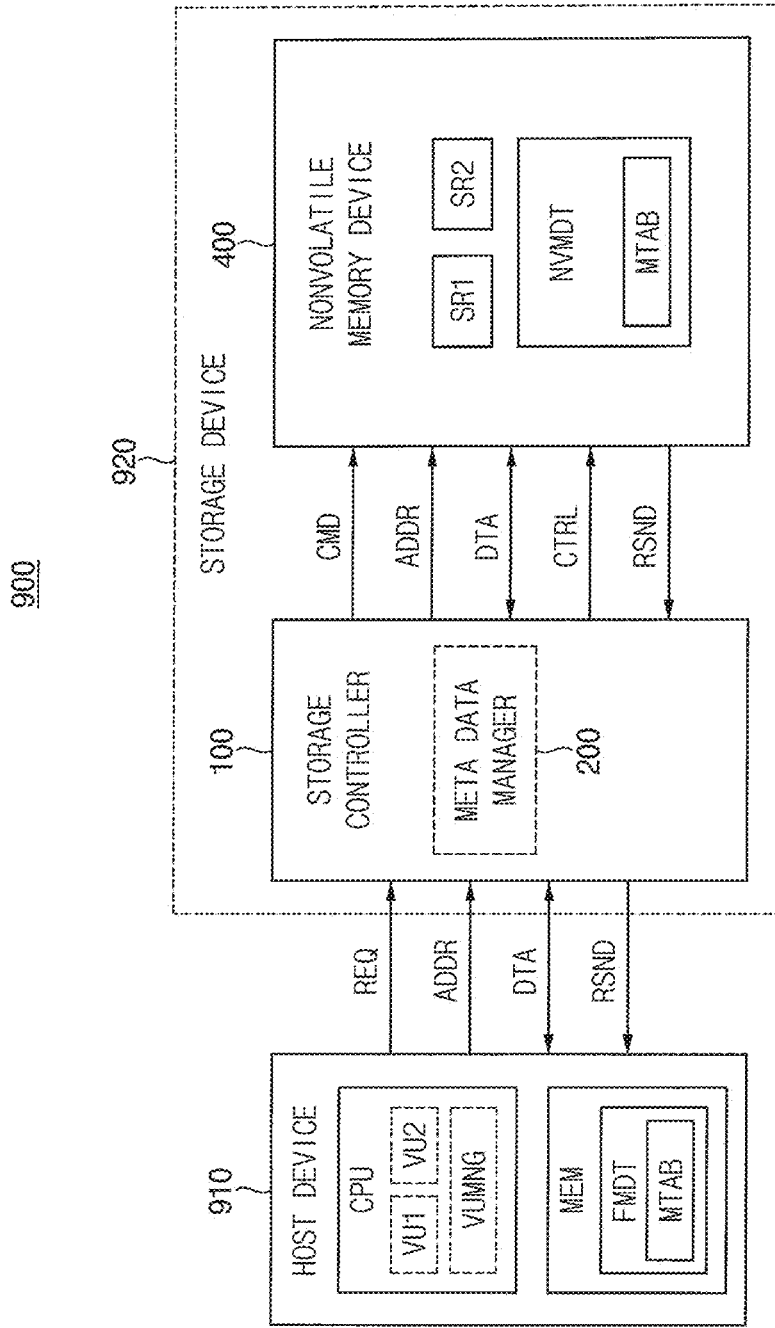
FIG. 21 is a block diagram illustrating a virtualized system including a storage device according to some example embodiments.

FIG. 21 is a block diagram illustrating a virtualized system including a storage device according to some example embodiments.

Referring to FIG. 21, a storage system 900 may include a host device 910 and a storage device 920. The storage device 920 may include a storage controller 100 and a nonvolatile memory device 400. For example, the storage device 920 may be a solid state drive (SSD), an embedded multimedia card (eMMC), a universal flash storage (UFS), or the like.

The host device 910 may be or include a data processing device such as a central processing unit CPU and a volatile memory device MEM. The storage device 920 may be embedded with the host device 910 in an electronic device, or the storage device 920 may be detachable to an electronic device including the host device 910.

The host device 910 may transfer a data operation request (which may be referred to herein as simply a request) REQ and an associated address ADDR to the storage controller 100 to communicate data DTA with the storage controller 100. The storage controller 100 may transfer a response RSND to the request REQ to the host device 910. The request REQ may include a read request, a program request, and/or an erase request, respectively associated with one or more read operations, program operations, and/or erase operations. The program request may be referred to as a write request.

The storage controller 100 may control the nonvolatile memory device 400 based on the request REQ. The storage controller 100 may provide addresses ADDR, commands CMD, and control signals CTRL to perform the read operations, the program operations, and/or the erase operations. The program operation may be referred to as a write operation.

The storage controller 100 may control the nonvolatile memory device 400 to read data DTA stored in the nonvolatile memory device 400 in response to the read request received from the host device 910. The storage controller 100 may control the nonvolatile memory device 400 to write or program data DTA in the nonvolatile memory device 400 in response to the write or program request received from the host device 910. The storage controller 100 may control the nonvolatile memory device 400 to erase data stored in the nonvolatile memory device 400 in response to the erase request received from the host device 910. The nonvolatile memory device 400 may transfer a response RSND to the storage controller 100 in response to the command CMD.

The nonvolatile memory device 400 may be implemented with nonvolatile memory such as flash memory, MRAM (Magnetic RAM), FeRAM (Ferroelectric RAM), PRAM (Phase change RAM), ReRAM (Resistive RAM), or the like. The nonvolatile memory device 400 may be connected to the storage controller 100 through a plurality of channels CH0~CHm (not shown in FIG. 2). Hereinafter, some example embodiments will be described based on NAND flash memory, but the present disclosure is not limited to any particular kind of nonvolatile memory.

The storage controller 100 may include a metadata manager 200 configured to manage the metadata. The metadata include a firmware mapping table that stores mapping relations between the logical block address (or the logical page number) provided from the host device 910 and the physical block address of the nonvolatile memory device 400. In addition, the metadata may include other information for managing the operation and the storage memory space of the nonvolatile memory device 400.

When the storage system 900 is powered on, the metadata may be loaded from the nonvolatile memory device 400 and may be stored in the volatile memory device MEM in the host device 910. For example, the volatile memory device MEM may include a volatile memory, such as DRAM, SRAM, or the like. The metadata stored in the nonvolatile memory device 400 may be referred to as nonvolatile metadata NVMDT, and the metadata stored in the volatile memory device MEM may be referred to as firmware metadata FMDT. The firmware metadata FMDT may be changed during operations of the virtualized system, and a journaling scheme may be used to maintain consistency between the firmware metadata FMDT and the nonvolatile metadata NVMDT.

While the storage device 920 is powered on, the metadata manager 200 in the storage controller 100 may provide the firmware metadata FMDT based on the nonvolatile metadata NVMDT stored in the nonvolatile memory device 400.

As described above, the processor CPU may provide the virtualization environment including the plurality of virtual units VU1 and VU2 and the virtual unit manager VUMNG. The virtual unit manager VUMNG may allocate the plurality of unit storage regions SR1 and SR2 respectively corresponding to the plurality of virtual units VU1 and VU2 in the physical address space of the nonvolatile memory device 400. Each virtual unit VUi (i=1, 2) may perform a flash translation layer operation to convert the logical block address of each virtual unit VUi to the physical block address of each unit storage region SRi allocated to each virtual unit VUi. As such, the plurality of virtual units VU1 and VU2 may dispersively perform the flash translation layer operation inside the plurality of virtual units VU1 and VU2.

Figure 22:
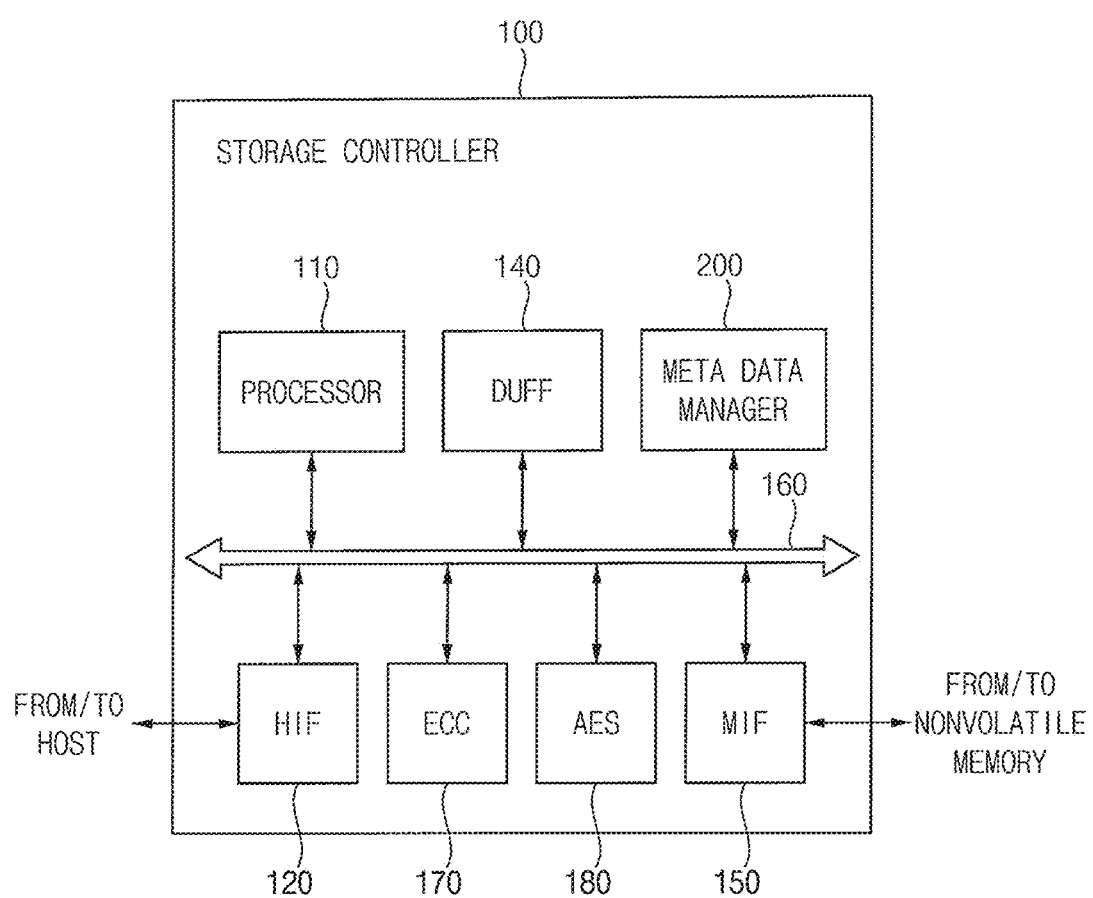
FIG. 22 is a block diagram illustrating an example embodiment of a storage controller included in the storage device in FIG. 21.

FIG. 22 is a block diagram illustrating an example embodiment of a storage controller included in the storage device in FIG. 21.

Referring to FIG. 22, a storage controller 100 may include a processor 110, a buffer memory BUFF 140, a metadata manager 200, a host interface HIF 120, an error correction code (ECC) engine 170, a memory interface MIF 150, an advanced encryption standard (AES) engine 180, and an internal bus system 160 that connects the components in the storage controller 100.

The processor 110 may control an operation of the storage controller 100 in response to commands received via the host interface 120 from a host device (e.g., the host device 910 in FIG. 21). For example, the processor 110 may control an operation of a storage device (e.g., the storage device 920 in FIG. 21), and may control respective components by employing firmware for operating the storage device.

The buffer memory 140 may store instructions and data executed and processed by the processor 110. For example, the buffer memory 140 may be implemented with a volatile memory, such as a DRAM, a SRAM, a cache memory, or the like.

The metadata manager 200 may manage the metadata and provide the firmware metadata FMDT to the host device 910 based on the nonvolatile metadata NVMDT stored in the nonvolatile memory device 400.

The ECC engine 170 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), or the like. In some embodiments, the ECC engine 170 may perform ECC encoding and ECC decoding using above-described codes or other error correction codes.

The host interface 120 may provide physical connections between the host device 910 and the storage device 920. The host interface 120 may provide an interface that corresponds to a bus format of the host device 910 for communication between the host device 910 and the storage device 920. In some example embodiments, the bus format of the host device 910 may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a SATA, a nonvolatile memory (NVM) express (NVMe), or other format.

The memory interface 150 may exchange data with a nonvolatile memory device (e.g., the nonvolatile memory device 400 in FIG. 21). The memory interface 150 may transfer data to the nonvolatile memory device 400, and/or may receive data read from the nonvolatile memory device 400. In some example embodiments, the memory interface 150 may be connected to the nonvolatile memory device 400 via one channel. In other example embodiments, the memory interface 150 may be connected to the nonvolatile memory device 400 via two or more channels. The memory interface 150 may be configured to comply with a standard protocol, such as Toggle or open NAND flash interface (ONFI).

The AES engine 180 may perform at least one of an encryption operation and a decryption operation on data input to the storage controller 100 using a symmetric-key algorithm. The AES engine 180 may include an encryption module and a decryption module. For example, the encryption module and the decryption module may be implemented as separate modules. For another example, one module capable of performing both encryption and decryption operations may be implemented in the AES engine 180.

Figure 23:
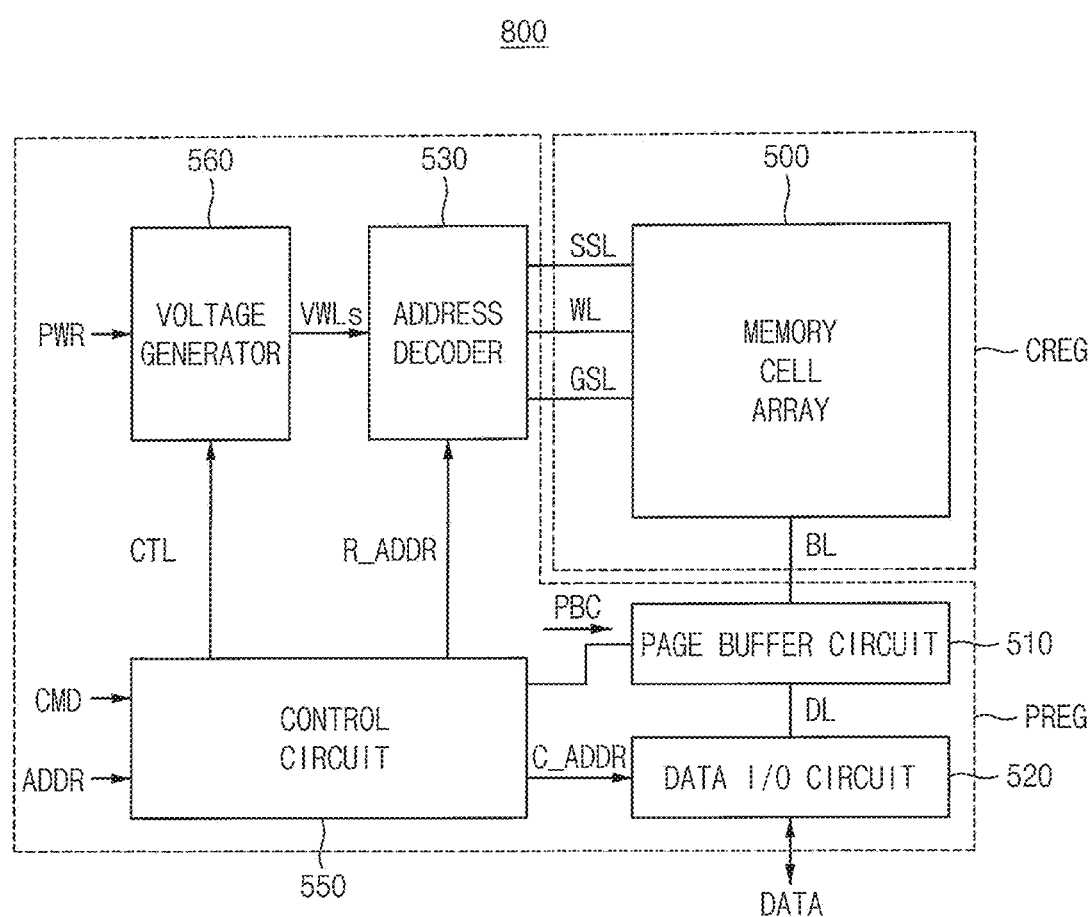
FIG. 23 is a block diagram illustrating an example embodiment of a nonvolatile memory device included in the storage device in FIG. 21.

FIG. 23 is a block diagram illustrating an example embodiment of a nonvolatile memory device included in the storage device in FIG. 21.

Referring to FIG. 23, a nonvolatile memory device 800 may include a memory cell array 500, a page buffer circuit 510, a data input/output (I//O) circuit 520, an address decoder 530, a control circuit 550, and a voltage generator 560. In some example embodiments, the nonvolatile memory device 800 may have a cell over periphery (COP) structure in which a memory cell array is arranged over peripheral circuits. In this case, the memory cell array 500 may be formed in a cell region CREG, and the page buffer circuit 510, the data I/O circuit 520, the address decoder 530, the control circuit 550, and the voltage generator 560 may be formed in a peripheral region PREG.

The memory cell array 500 may be coupled to the address decoder 530 through string selection lines SSL, wordlines WL, and ground selection lines GSL. The memory cell array 500 may be coupled to the page buffer circuit 510 through a bitlines BL. The memory cell array 500 may include memory cells coupled to the wordlines WL and the bitlines BL. In some example embodiments, the memory cell array 500 may be a three-dimensional memory cell array, which may be formed on a substrate in a three-dimensional structure (or a vertical structure). In this case, the memory cell array 500 may include cell strings (e.g., NAND strings) that are vertically oriented such that at least one memory cell is located over another memory cell.

The control circuit 550 may receive a command signal CMD and an address signal ADDR from a memory controller, and may control erase, program, and read operations of the nonvolatile memory device 800 in response to (or based on) at least one of the command signal CMD and the address signal ADDR. The erase operation may include performing a sequence of erase loops, and the program operation may include performing a sequence of program loops. Each program loop may include a program operation and a program verification operation. Each erase loop may include an erase operation and an erase verification operation. The read operation may include a normal read operation and data recover read operation.

In some example embodiments, the control circuit 550 may generate a control signals CTL used to control the operation of the voltage generator 560, and may generate a page buffer control signal PBC for controlling the page buffer circuit 510, based on the command signal CMD, and may generate a row address R_ADDR and a column address C_ADDR based on the address signal ADDR. The control circuit 550 may provide the row address R_ADDR to the address decoder 530, and may provide the column address C_ADDR to the data I/O circuit 520.

The address decoder 530 may be coupled to the memory cell array 500 through the string selection lines SSL, the wordlines WL, and the ground selection lines GSL. During the program operation or the read operation, the address decoder 530 may determine (or select) one of the wordlines WL as a selected wordline, and may determine or designate the remaining wordlines WL other than the selected wordline as unselected wordlines based on the row address R_ADDR.

In addition, during the program operation or the read operation, the address decoder 530 may determine one of the string selection lines SSL as a selected string selection line and determine or designate the remaining the string selection lines SSL other than the selected string selection line as unselected string selection lines based on the row address R_ADDR.

The voltage generator 560 may generate wordline voltages VWL, which are used for the operation of the memory cell array 500 of the nonvolatile memory device 800, based on the control signals CTL. The voltage generator 560 may receive the power PWR from the memory controller. The wordline voltages VWL may be applied to the wordlines WL through the address decoder 530.

In some example embodiments, during the erase operation, the voltage generator 560 may apply an erase voltage to a well and/or a common source line of a memory block, and may apply an erase permission voltage (e.g., a ground voltage) to all of the wordlines of the memory block or a portion of the wordlines based on an erase address. During the erase verification operation, the voltage generator 560 may apply an erase verification voltage simultaneously to all of the wordlines of the memory block or sequentially (e.g., one by one) to the wordlines.

In some example embodiments, during the program operation, the voltage generator 560 may apply a program voltage to the selected wordline, and may apply a program pass voltage to the unselected wordlines. During the program verification operation, the voltage generator 560 may apply a program verification voltage to the first wordline, and may apply a verification pass voltage to the unselected wordlines.

During the normal read operation, the voltage generator 560 may apply a read voltage to the selected wordline, and may apply a read pass voltage to the unselected wordlines. During the data recover read operation, the voltage generator 560 may apply the read voltage to a wordline adjacent to the selected wordline, and may apply a recover read voltage to the selected wordline.

The page buffer circuit 510 may be coupled to the memory cell array 500 through the bitlines BL. The page buffer circuit 510 may include multiple buffers. In some example embodiments, each buffer may be connected to only a single bitline. In some example embodiments, each buffer may be connected to two or more bitlines. The page buffer circuit 510 may temporarily store data to be programmed in a selected page or data read out from the selected page of the memory cell array 500.

The data I/O circuit 520 may be coupled to the page buffer circuit 510 through data lines DL. During the program operation, the data I/O circuit 520 may receive program data DATA received from the memory controller and provide the program data DATA to the page buffer circuit 510 based on the column address C_ADDR received from the control circuit 550. During the read operation, the data I/O circuit 520 may provide read data DATA, having been read from the memory cell array 500 and stored in the page buffer circuit 510, to the memory controller based on the column address C_ADDR received from the control circuit 550.

The page buffer circuit 510 and the data I/O circuit 520 may read data from a first area of the memory cell array 500, and may write this read data to a second area of the memory cell array 500 (e.g., without transmitting the data to a source external to the nonvolatile memory device 800, such as to the memory controller). Thus, the page buffer circuit 510 and the data I/O circuit 520 may perform a copy-back operation.

Figure 24:
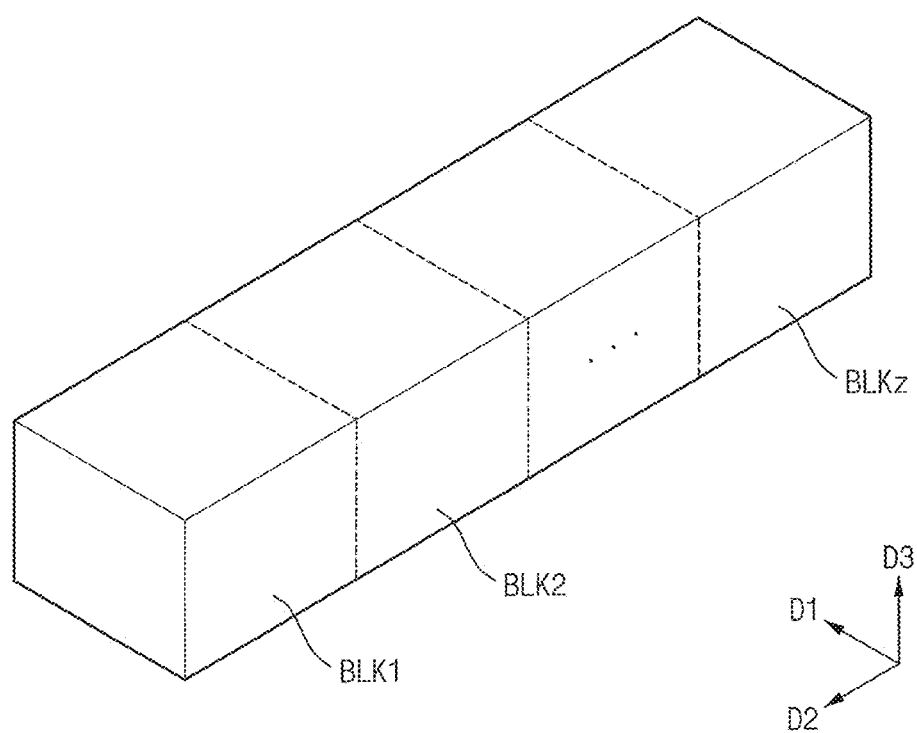
FIG. 24 is a block diagram illustrating a memory cell array included in the nonvolatile memory device of FIG. 23.
Figure 25:
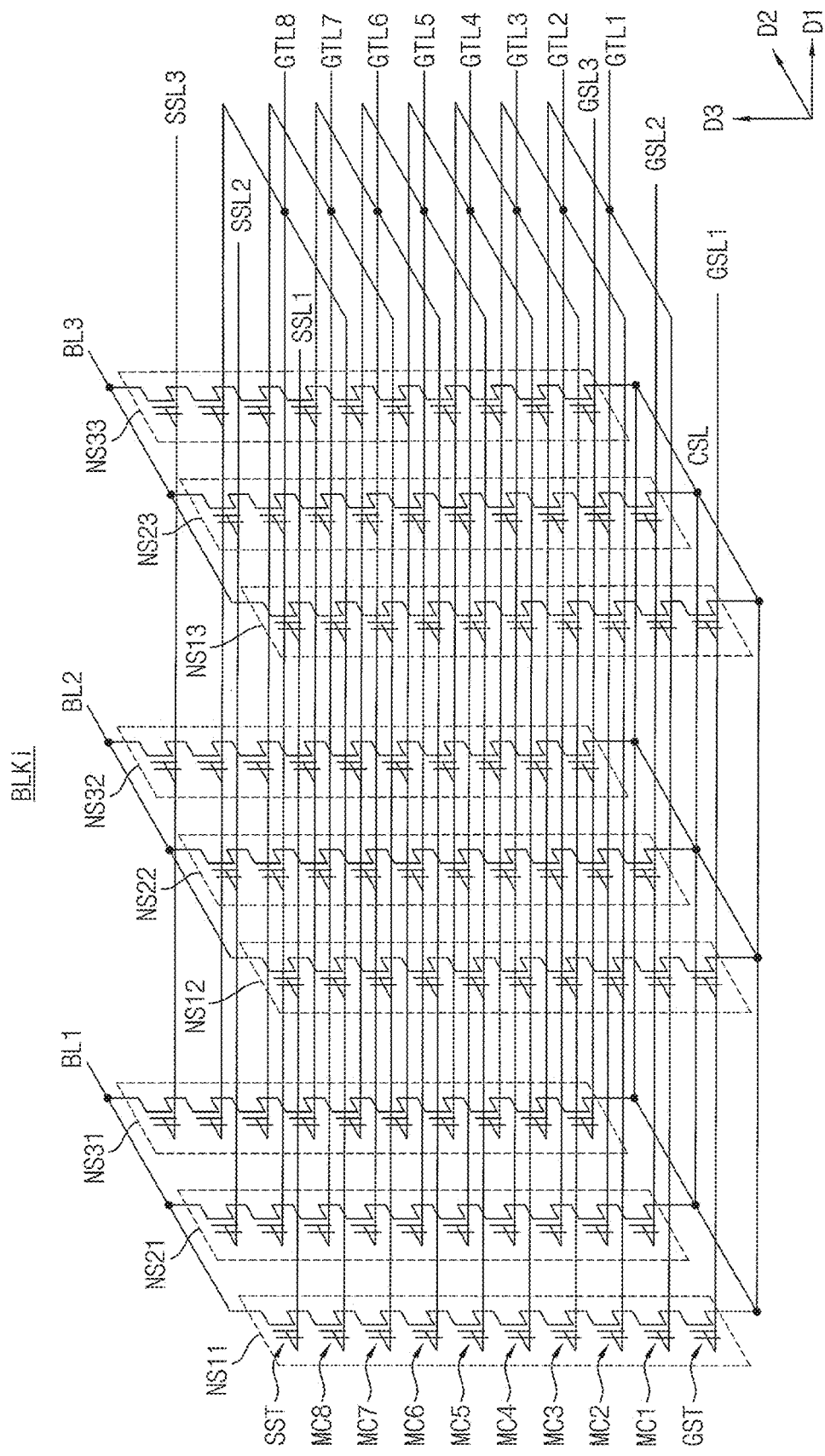
FIG. 25 is a circuit diagram illustrating an equivalent circuit of a memory block included in the memory cell array of FIG. 24.

FIG. 24 is a block diagram illustrating a memory cell array included in the nonvolatile memory device of FIG. 23, and FIG. 25 is a circuit diagram illustrating an equivalent circuit of a memory block included in the memory cell array of FIG. 24.

Referring to FIG. 24, the memory cell array 500 may include memory blocks BLK1 to BLKz. In some example embodiments, the memory blocks BLK1 to BLKz may be selected by the address decoder 530 of FIG. 23. For example, the address decoder 530 may select a particular memory block BLK corresponding to a block address among the memory blocks BLK1 to BLKz.

A memory block BLKi of FIG. 25 may be formed on a substrate in a three-dimensional structure (or a vertical structure). For example, NAND strings or cell strings included in the memory block BLKi may be formed in a vertical direction D3 perpendicular to an upper surface of a substrate.

Referring to FIG. 25, the memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 25, each of the NAND strings NS11 to NS33 is illustrated to include eight memory cells MC1 to MC8. However, example embodiments are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same or similar height may be commonly connected, and the ground selection lines GSL1 to GSL3 and the string selection lines SSL1 to SSL3 may be separated. In FIG. 25, the memory block BLKi is illustrated as being coupled to eight gate lines GTL1 to GTL8 and three bitlines BL1 to BL3. However, example embodiments are not limited thereto, and each memory block in the memory cell array 500 may be coupled to various numbers of wordlines and various numbers of bitlines.

Figure 26:
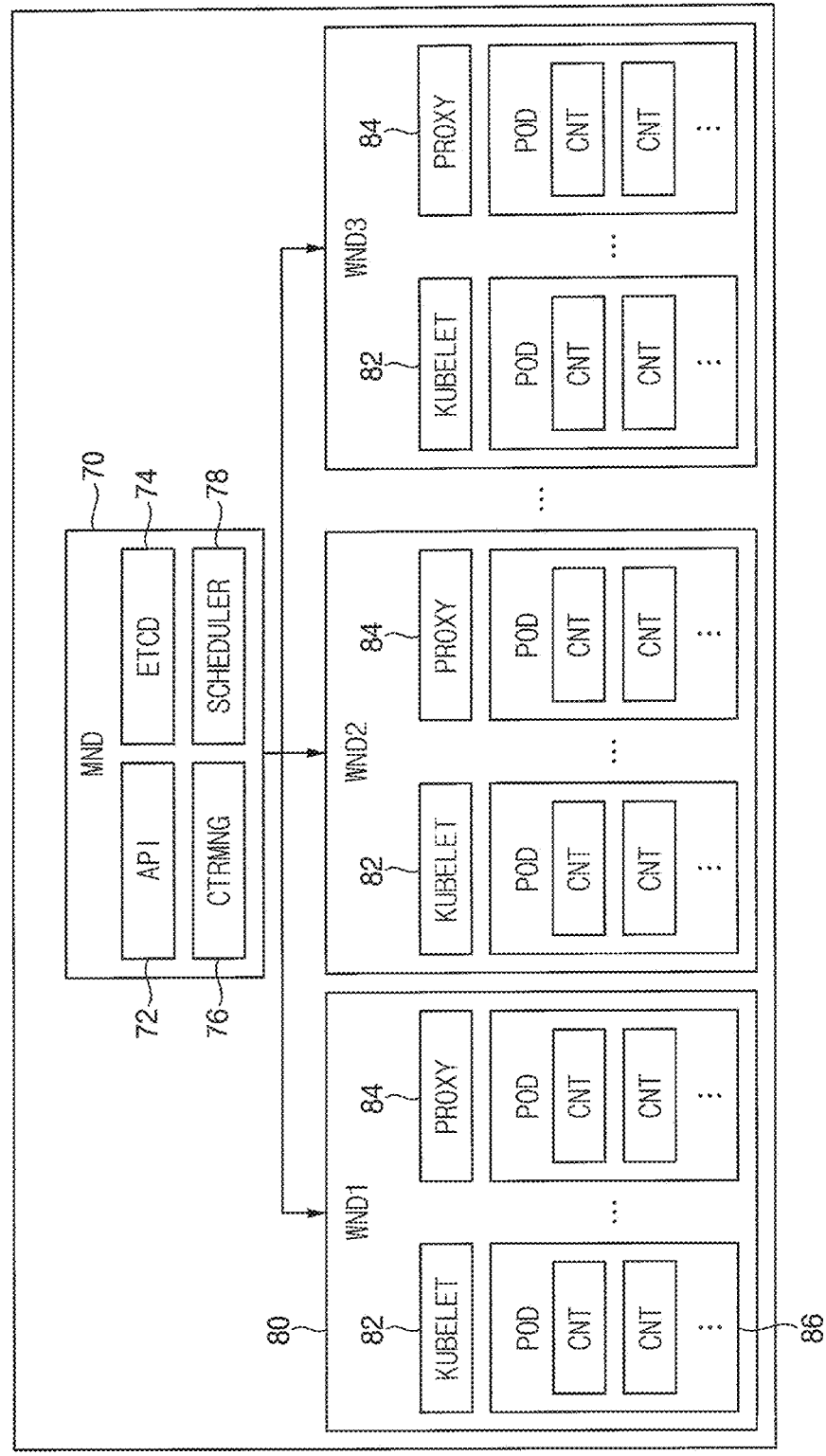
FIG. 26 is a block diagram illustrating an example embodiment of a container orchestration platform structure of a virtualized system according to some example embodiments.

FIG. 26 is a block diagram illustrating an example embodiment of a container orchestration platform structure of a virtualized system according to some example embodiments.

Referring to FIG. 26, a virtualized system providing virtualization of hardware resources may include a master node MND 70 and worker nodes WND1~WND3 80 to perform container management or orchestration such as generation, disposition, execution, execution block and deletion of containers.

The container provided by the virtualized system is a main agent to execute user requests and may include a docker, a Linux container, a clean container, and the like. In addition, the virtualized system may include a container orchestration platform to perform the container management.

In some example embodiments, the container orchestration platform may include the open source platform such as Kubernetes, and the container may be a docker container, but example embodiments are not limited thereto. A pod indicates a set of one or more containers and the pod is a basic unit of container scheduling.

The master node 70 may be configured to manage the entire cluster including the plurality of worker nodes 80. The master node 70 may include an API server 72, an ETCD 74, a controller manager CTRMNG 76, a scheduler 78, and so on.

The worker node 80 may be configured to receive instructions from the master node 70 and perform real tasks. The worker node 80 may include a Kublet 82, a proxy (or a Kube-proxy) 84, and so on. Each worker node 80 may include at least one pod, and each pod may include at least one container.

Figure 27:
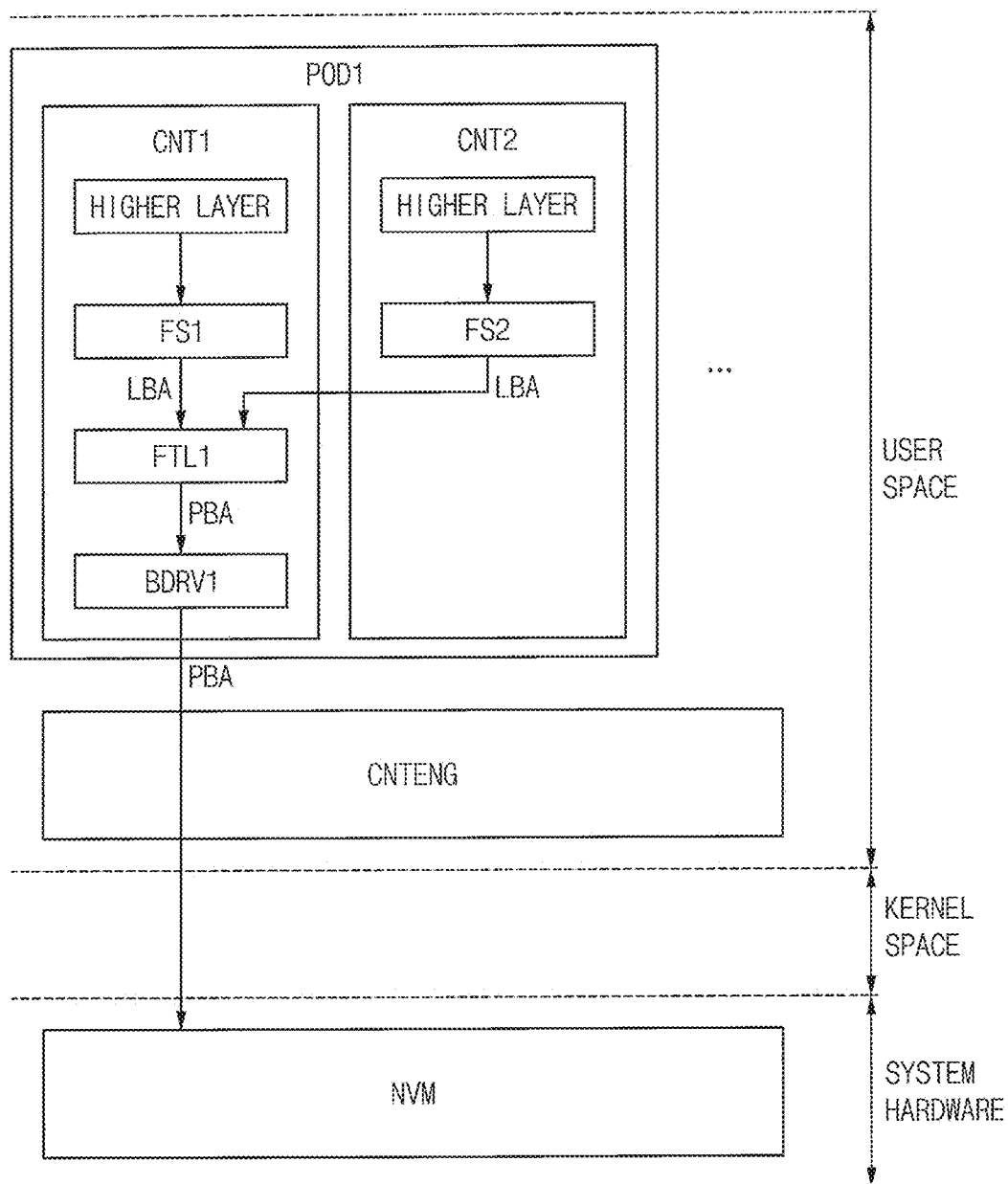
FIG. 27 is a block diagram illustrating a container-based virtualized system according to some example embodiments.

FIG. 27 is a block diagram illustrating a container-based virtualized system according to some example embodiments.

A virtualized system 13 of FIG. 27 is similar to the virtualized system 11 of FIG. 10, and the descriptions repeated with FIG. 10 may be omitted.

As described with reference to FIG. 26, a plurality of containers may be grouped into one or more pods such that each pod includes one or more containers. In this case, one container included in each pod may perform the flash translation layer operation with respect to all containers included in each pod.

Referring to FIG. 27, a first pod POD1 may include a first container CNT1 and a second container CNT2. For example, only the first container CNT1 may include the above-described partial flash translation layer FTL1 and the second container CNT2 may not include the partial flash translation layer. The second container CNT2 may provide the logical block address LBA from the file system FS2 to the partial flash translation layer FTL1 of the first container CNT1. The partial flash translation layer FTL1 may provide the physical block address PBA mapped to the logical block address LBA provided from the file system FS1 of the first container CNT1 and the file system FS2 of the second container CNT2. The block device driver BDRV1 may perform the storage access operation based on the physical block address PBA provided from the partial flash translation layer FTL1.

As such, the virtualized system 13 may perform the flash translation layer operation dispersively by units of pods.

Figure 28:
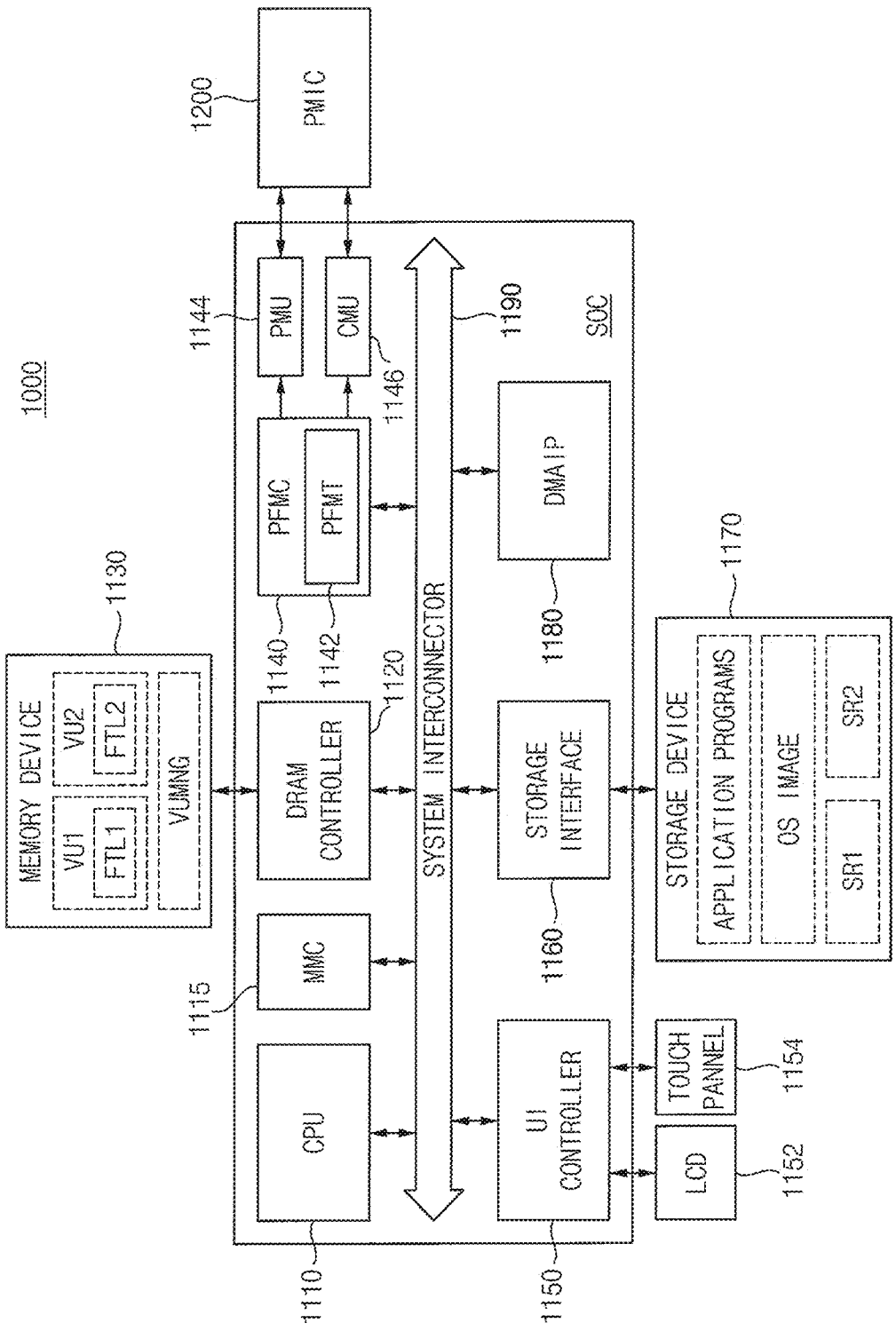
FIG. 28 is a block diagram illustrating a virtualized system according to some example embodiments.

FIG. 28 is a block diagram illustrating a virtualized system according to some example embodiments.

Referring to FIG. 28, a virtualized system 1000 may include a system on chip (SOC), a working memory 1130, a display device (LCD) 1152, a touch panel 1154, a storage device 1170, a power management integrated circuit (PMIC) 1200, etc. The SOC may include a central processing unit (CPU) 1110, a memory management circuit MMC 1115, a DRAM controller 1120, a performance controller 1140, a user interface controller (UI controller) 1150, a storage interface 1160, and a direct memory access device DMAIP 1180 having a function of direct memory access, a power management unit (PMU) 1144, a clock management unit (CMU) 1146, etc. It will be understood that components of the virtualized system 1000 are not limited to the components shown in FIG. 18. For example, the virtualized system 1000 may further include a hardware codec for processing image data, a security block, and the like.

The processor 1110 executes software (for example, an application program, an operating system (OS), and device drivers) for the virtualized system 1000. The processor 1110 may execute the operating system (OS) which may be loaded into the working memory 1130. The processor 1110 may execute various application programs to be driven on the operating system (OS). The processor 1110 may be provided as a homogeneous multi-core processor or a heterogeneous multi-core processor. A multi-core processor is a computing component including at least two independently drivable processors (hereinafter referred to as "cores" or "processor cores"). Each of (or alternatively, at least one of) the cores may independently read and execute program instructions.

The DRAM controller 1120 provides interfacing between the working memory 1130 and the SOC. The DRAM controller 1120 may access the working memory 1130 according to a request of the processor 1110 or another intellectual property (IP) block.

The memory management circuit 1115 may manage the core access of the processor 1110 to the working memory 1130 and the direct access of the direct memory access device 1180 to the working memory 1130.

The operating system (OS) or basic application programs may be loaded into the working memory 1130 during a booting operation. For example, a virtual unit manager VUMNG and a plurality of virtual units VU1 and VU2 stored in the storage device 1170 may be loaded into the working memory 1130 based on a booting sequence during booting of the virtualized system 1000.

As described above, the processor 1110 may provide a virtualization environment including the plurality of virtual units VU1 and VU2 and the virtual unit manager VUMNG. The virtual unit manager VUMNG may allocate a plurality of unit storage regions SR1 and SR2 respectively corresponding to the plurality of virtual units VU1 and VU2 in the physical address space of the nonvolatile memory device included in the storage device 1170. Each virtual unit VUi (i=1, 2) may perform a flash translation layer operation to convert the logical block address of each virtual unit VUi to the physical block address of each unit storage region SRi allocated to each virtual unit VUi. As such, the plurality of virtual units VU1 and VU2 may dispersively perform the flash translation layer operation inside the plurality of virtual units VU1 and VU2.

The performance controller 1140 may adjust operation parameters of the SOC according to a control request provided from the kernel of the operating system (OS). For example, the performance controller 1140 may adjust the level of DVFS to enhance performance of the SOC.

The user interface controller 1150 controls user input and output from user interface devices. For example, the user interface controller 1150 may display a keyboard screen for inputting data to the LCD 1152 according to the control of the processor 1110. Alternatively, the user interface controller 1150 may control the LCD 1152 to display data that a user request. The user interface controller 1150 may decode data provided from user input means, such as a touch panel 1154, into user input data.

The storage interface 1160 accesses the storage device 1170 according to a request of the processor 1110. For example, the storage interface 1160 provides interfacing between the SOC and the storage device 1170. For example, data processed by the processor 1110 is stored in the storage device 1170 through the storage interface 1160. Alternatively, data stored in the storage device 1170 may be provided to the processor 1110 through the storage interface 1160.

The storage device 1170 is provided as a storage medium of the virtualized system 1000. The storage device 1170 may store application programs, an OS image, and various types of data. The storage device 1170 may be provided as a memory card (e.g., MMC, eMMC, SD, MicroSD, etc.). The storage device 1170 may include a NAND-type flash memory with high-capacity storage capability. Alternatively, the storage device 1170 may include a next-generation nonvolatile memory such as PRAM, MRAM, ReRAM, and FRAM or a NOR-type flash memory.

The direct memory access device 1180 may be provided as a separate intellectual property (IP) component to increase processing speed of a multimedia or multimedia data. For example, the direct memory access device 1180 may be provided as an intellectual property (IP) component to enhance processing performance of a text, audio, still images, animation, video, two-dimensional data or three-dimensional data.

A system interconnector 1190 may be a system bus to provide an on-chip network in the SOC. The system interconnector 1190 may include, for example, a data bus, an address bus, and a control bus. The data bus is a data transfer path. A memory access path to the working memory 1130 or the storage device 1170 may also be provided. The address bus provides an address exchange path between intellectual properties (IPs). The control bus provides a path along which a control signal is transmitted between intellectual properties (IPs). However, the configuration of the system interconnector 1190 is not limited to the above description and the system interconnector 190 may further include arbitration means for efficient management.

The inventive concepts may be applied to any electronic devices and systems. For example, the inventive concepts may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, a cloud system, an automotive driving system. etc.

Any of the elements and/or functional blocks disclosed above may include or be implemented in processing circuitry such as hardware including logic circuits; a hardware/software combination such as a processor executing software; or a combination thereof. For example, The PRC 20, Storage controller 100, Meta data manager 200, processor 110, control circuit 550, CMU 1146, PMU 1144, DRAM controller 1120, and UI controller 1150 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

The foregoing is illustrative of example embodiments and is not to be construed as limiting thereof. Although a few example embodiments have been described, those skilled in the art will readily appreciate that many modifications are possible in the example embodiments without materially departing from the present inventive concepts.

What is claimed is:

1. A virtualized system comprising:
   a nonvolatile memory device; and
   a processing circuitry configured to
     provide a virtualization environment,
     implement a plurality of virtual units configured to operate independently of each other in the virtualization environment, and
     perform a flash translation layer operation inside the plurality of virtual units, the flash translation layer operation including converting a logical block address associated with a storage access operation of the nonvolatile memory device to a physical block address of the nonvolatile memory device,
     reboot a first virtual unit among the plurality of virtual units in response to a flash translation error in the first virtual unit while other virtual units among the plurality of virtual units perform the storage access operation, and
     implement a virtual unit manager configured to control the plurality of virtual units in the virtualization environment.

2. The virtualized system of claim 1, wherein the plurality of virtual units correspond to a plurality of containers, and the virtual unit manager corresponds to a container engine.

3. The virtualized system of claim 1, wherein the plurality of virtual units correspond to a plurality of virtual machines, and the virtual unit manager corresponds to a hypervisor.

4. The virtualized system of claim 1, wherein the plurality of virtual units are included in a user space of the virtualization environment, and the plurality of virtual units are configured to transfer the physical block address to the nonvolatile memory device independently of a kernel space of the virtualization environment.

5. The virtualized system of claim 1, wherein
   the virtual unit manager is configured to allocate a plurality of unit storage regions respectively corresponding to the plurality of virtual units in a physical address space of the nonvolatile memory device, and
   each virtual unit among the plurality of virtual units is configured to map the logical block address to the physical block address of each unit storage region corresponding to the virtual unit.

6. The virtualized system of claim 5, wherein the virtual unit manager is configured to monitor a storage usage state of the plurality of virtual units with respect to the nonvolatile memory device, and vary sizes of the plurality of unit storage regions based on the storage usage state.

7. The virtualized system of claim 5, wherein
   the nonvolatile memory device includes a plurality of memory blocks
   a memory block is a unit of an erase operation, and
   the virtual unit manager is configured to set a size of each of the plurality of unit storage regions by units of memory blocks.

8. The virtualized system of claim 5, wherein each virtual unit among the plurality of virtual units is configured to independently perform a garbage collection operation with respect to each unit storage region corresponding to the virtual unit.

9. The virtualized system of claim 5, wherein each virtual unit among the plurality of virtual units includes:
a file system configured to provide the logical block address associated with the storage access operation;
a partial flash translation layer configured to
manage a partial mapping table that includes mapping relations between the logical block address of each virtual unit and the physical block address of each unit storage region, and
provide the physical block address mapped to the logical block address provided from the file system based on the partial mapping table; and
a block device driver configured to perform the storage access operation based on the physical block address provided from the partial flash translation layer.

10. The virtualized system of claim 5, wherein each virtual unit among the plurality of virtual units includes:
a file system configured to provide the logical block address associated with the storage access operation; and
a partial flash translation layer configured to
manage a partial mapping table that includes mapping relations between the logical block address of each virtual unit and the physical block address of each unit storage region, and
provide the physical block address mapped to the logical block address provided from the file system based on the partial mapping table, and wherein the virtual unit manager includes
a block device driver configured to perform the storage access operation based on the physical block address provided from the plurality of virtual units, the block device driver being included in a user space of the virtualization environment.

11. The virtualized system of claim 5, further comprising:
a volatile memory device,
wherein the virtual unit manager is configured to allocate a plurality of unit memory regions respectively corresponding to the plurality of virtual units in a physical address space of the volatile memory device.

12. The virtualized system of claim 11, wherein
the virtual unit manager is configured to load a plurality of partial mapping tables respectively corresponding to the plurality of virtual units from the nonvolatile memory device respectively to the plurality of unit memory regions of the volatile memory device while the virtualized system is booted, and
each partial mapping table includes mapping relations between the logical block address of each virtual unit and the physical block address of each unit storage region.

13. The virtualized system of claim 12, wherein each virtual unit among the plurality of virtual units is configured to perform the flash translation layer operation based on each partial mapping table corresponding to each virtual unit stored in each unit memory region.

14. The virtualized system of claim 12, wherein the virtual unit manager is configured to back up the plurality of partial mapping tables respectively from the plurality of unit memory regions of the volatile memory device to the nonvolatile memory device while the virtualized system is powered off.

15. A virtualized system comprising:
a nonvolatile memory device;
a volatile memory device; and
a processing circuitry configured to
provide a virtualization environment,
implement a plurality of containers configured to
operate independently of each other in the virtualization environment,
perform a flash translation layer operation for the plurality of containers, the flash translation layer operation including converting a logical block address associated with a storage access operation of the nonvolatile memory device to a physical block address of the nonvolatile memory device, and
reboot a first container among the plurality of containers in response to a flash translation error in the first container while other containers among the plurality of containers perform the storage access operation, and
implement a container engine configured to control the plurality of containers in the virtualization environment,
wherein the container engine is further configured to allocate a plurality of unit storage regions respectively corresponding to the plurality of containers in a physical address space of the nonvolatile memory device, and
wherein each container among the plurality of containers is configured to map the logical block address to the physical block address of each unit storage region corresponding to the container.

16. The virtualized system of claim 15, wherein
the container engine is configured to allocate a plurality of unit memory regions respectively corresponding to the plurality of containers in a physical address space of the volatile memory device,
the container engine is configured to load a plurality of partial mapping tables respectively corresponding to the plurality of containers respectively from the nonvolatile memory device respectively to the plurality of unit memory regions of the volatile memory device while the virtualized system is booted,
each partial mapping table includes mapping relations between the logical block address of each container among the plurality of containers and the physical block address of each unit storage region, and
each container among the plurality of containers is configured to perform the flash translation layer operation based on each partial mapping table corresponding to the container.

17. The virtualized system of claim 15, wherein the plurality of containers are grouped into one or more pods such that each pod includes one or more containers, and
wherein one container included in each pod performs the flash translation layer operation with respect to all containers included in each pod.

18. A method of controlling access to a nonvolatile memory device in a virtualization environment including a plurality of virtual units and a virtual unit manager configured to control the plurality of virtual units, the method comprising:
allocating, by the virtual unit manager, a plurality of unit storage regions respectively corresponding to the plurality of virtual units in a physical address space of the nonvolatile memory device;

performing, by each virtual unit among the plurality of virtual units, a flash translation layer operation to convert a logical block of the virtual unit to a physical block address of each unit storage region allocated to the virtual unit;

performing a storage access operation of the nonvolatile memory device based on the physical block address provided from each virtual unit; and rebooting a first virtual unit among the plurality of virtual units in response to a flash translation error in the first virtual unit while other virtual units among the plurality of virtual units perform the storage access operation.

19. The method of claim 18, further comprising:

allocating, by the virtual unit manager, a plurality of unit memory regions respectively corresponding to the plurality of virtual units in a physical address space of a volatile memory device;

loading, by the virtual unit manager, a plurality of partial mapping tables respectively corresponding to the plurality of virtual units from the nonvolatile memory device respectively to the plurality of unit memory regions of the volatile memory device while a virtualized system providing the virtualization environment is booted; and performing, by each virtual unit among the plurality of virtual units, the flash translation layer operation based on each partial mapping table corresponding to the virtual unit stored in the plurality of unit memory regions.

* * * * *